United States Patent [19]

Nakamura et al.

[11] Patent Number: 5,448,556
[45] Date of Patent: Sep. 5, 1995

[54] EXCHANGE SYSTEM HANDLING AN IN-BAND SIGNAL

[75] Inventors: Katsuyuki Nakamura; Satoshi Kakuma, both of Kawasaki, Japan

[73] Assignee: Fujitsu Limited, Kawasaki, Japan

[21] Appl. No.: 183,914

[22] Filed: Jan. 21, 1994

Related U.S. Application Data

[63] Continuation of Ser. No. 757,904, Sep. 11, 1991, abandoned.

[30] Foreign Application Priority Data

Sep. 11, 1990 [JP] Japan ................... 2-240558

[51] Int. Cl.⁶ .................... H04Q 11/04; H04J 3/12
[52] U.S. Cl. ......................... 370/58.2; 370/66; 370/68.1; 370/110.1
[58] Field of Search ................. 370/55, 58.1–58.3, 370/59, 63–66, 68–68.1, 110.1, 111, 100.1, 105.1; 379/93–94, 207, 219, 229

[56] References Cited

U.S. PATENT DOCUMENTS

| | | | |
|---|---|---|---|
| 4,488,292 | 12/1984 | Troost | 370/63 |
| 4,782,479 | 11/1988 | Rozema | 370/66 |
| 5,063,592 | 11/1991 | Cannella et al. | 379/207 |
| 5,128,929 | 7/1992 | Kobayashi | 370/58.1 |
| 5,130,979 | 7/1992 | Ohtawa | 370/58.1 |
| 5,144,624 | 9/1992 | Sharper et al. | 370/68.1 |
| 5,144,625 | 9/1992 | Cain et al. | 370/110.1 |

FOREIGN PATENT DOCUMENTS 63-90290  4/1988  Japan .
64-18328  1/1989  Japan .

*Primary Examiner*—Hassan Kizou
*Attorney, Agent, or Firm*—Staas & Halsey

[57] ABSTRACT

An exchange system of a digital communication system includes a switch, and a frame correction numeral determining part for determining a frame correction numeral corresponding to a time delay of a path which is actually formed by the switch. An in-band signal dropping unit drops an in-band signal from the input time slots in a frame which lags behind a specific frame by the frame correction numeral. An in-band signal inserting part inserts the in-band signal into the output time slots of the specific frame of a subsequent multiframe subsequent to a multiframe having the input time slots from which the in-band signal is dropped by the in-band signal dropping unit.

8 Claims, 23 Drawing Sheets

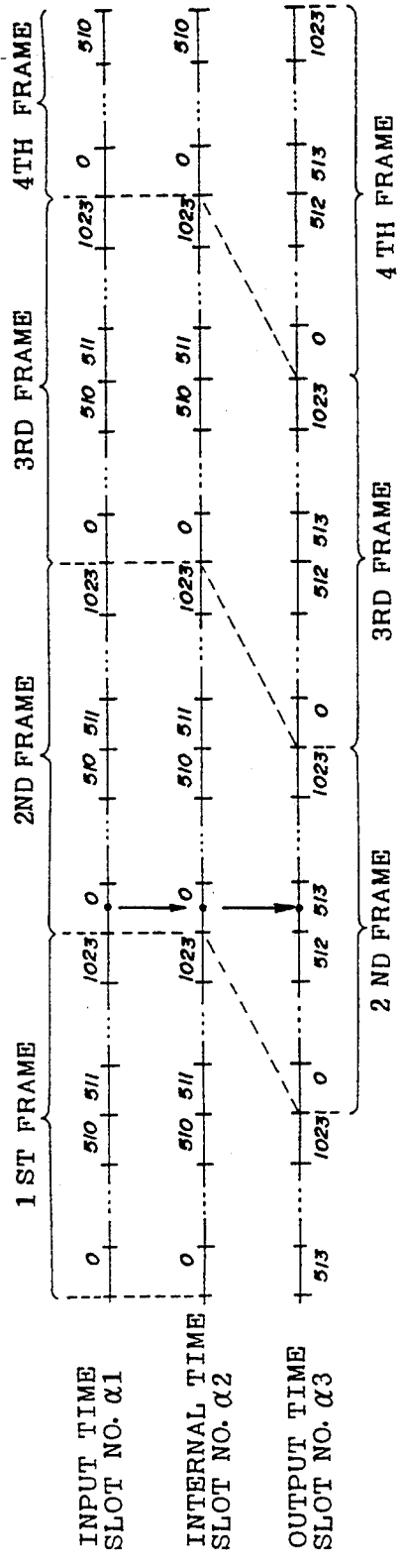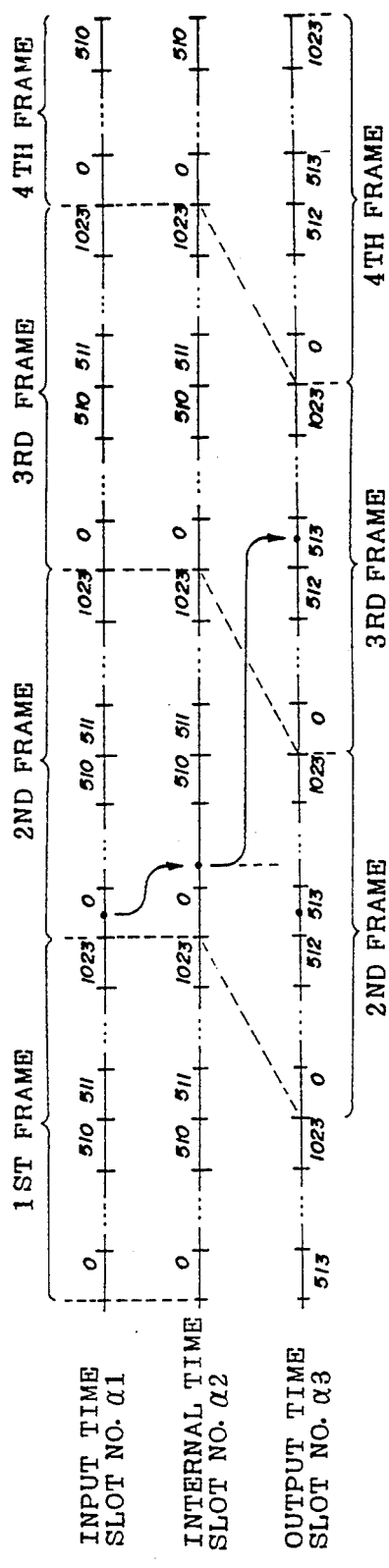

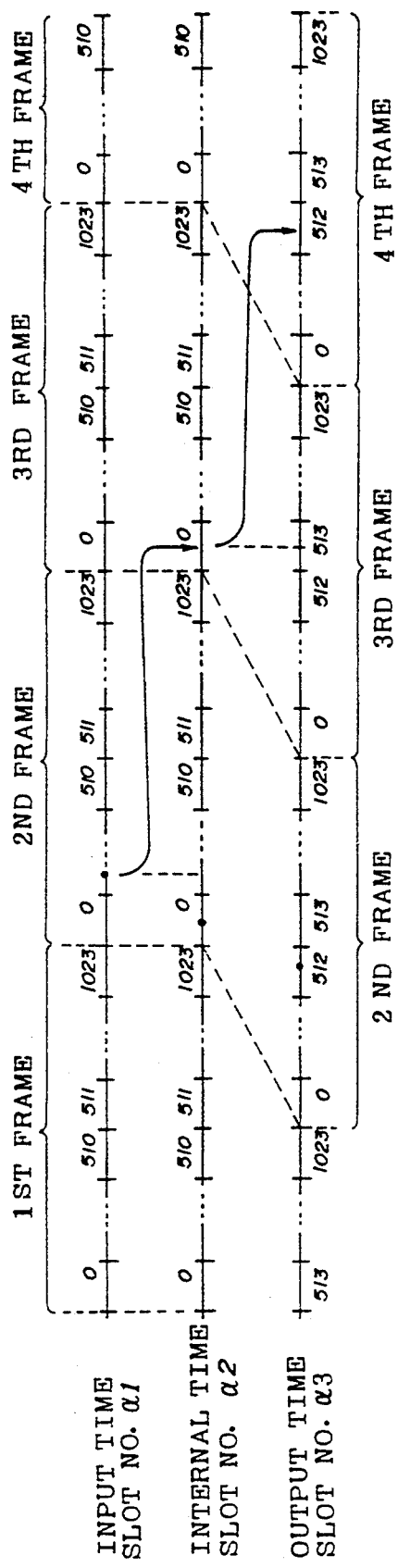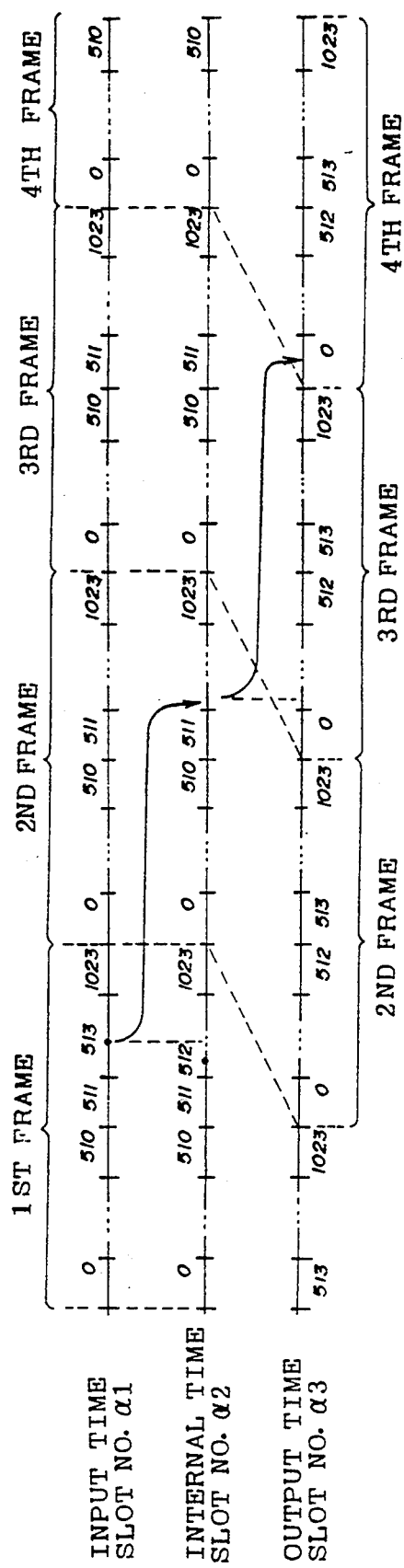

FIG. 6A

| NUMBER OF FRAMES SHOWING DELAY TIME (FRAME CORRECTION NUMERAL) | RELATIONSHIPS BETWEEN TIME SLOTS |
|---|---|
| 0 | $\alpha_1 \leq \alpha_2 < 511, \quad \alpha_2 + 513 \leq \alpha_3$ |
| 1 | $\alpha_1 \leq \alpha_2 < 511, \quad \alpha_2 + 513 > \alpha_3$ |
|   | $\alpha_1 \leq \alpha_2, \alpha_2 \geq 511, \alpha_2 - 511 \leq \alpha_3$ |
|   | $\alpha_1 > \alpha_2, \alpha_2 < 511, \alpha_2 + 513 \leq \alpha_3$ |
| 2 | $\alpha_1 > \alpha_2, \alpha_2 < 511, \alpha_2 + 513 > \alpha_3$ |
|   | $\alpha_1 > \alpha_2, \alpha_2 \geq 511, \alpha_2 - 511 \leq \alpha_3$ |
|   | $\alpha_1 \leq \alpha_2, \alpha_2 \geq 511, \alpha_2 - 511 > \alpha_3$ |
| 3 | $\alpha_1 > \alpha_2, \alpha_2 > 511, \alpha_2 - 511 > \alpha_3$ |

FIG. 6B

| NUMBER OF FRAMES SHOWING DELAY TIME ||
|---|---|
| UP HIGHWAY | DOWN HIGHWAY |
| 0 | 3 |
| 1 | 2 |
| 2 | 1 |
| 3 | 0 |

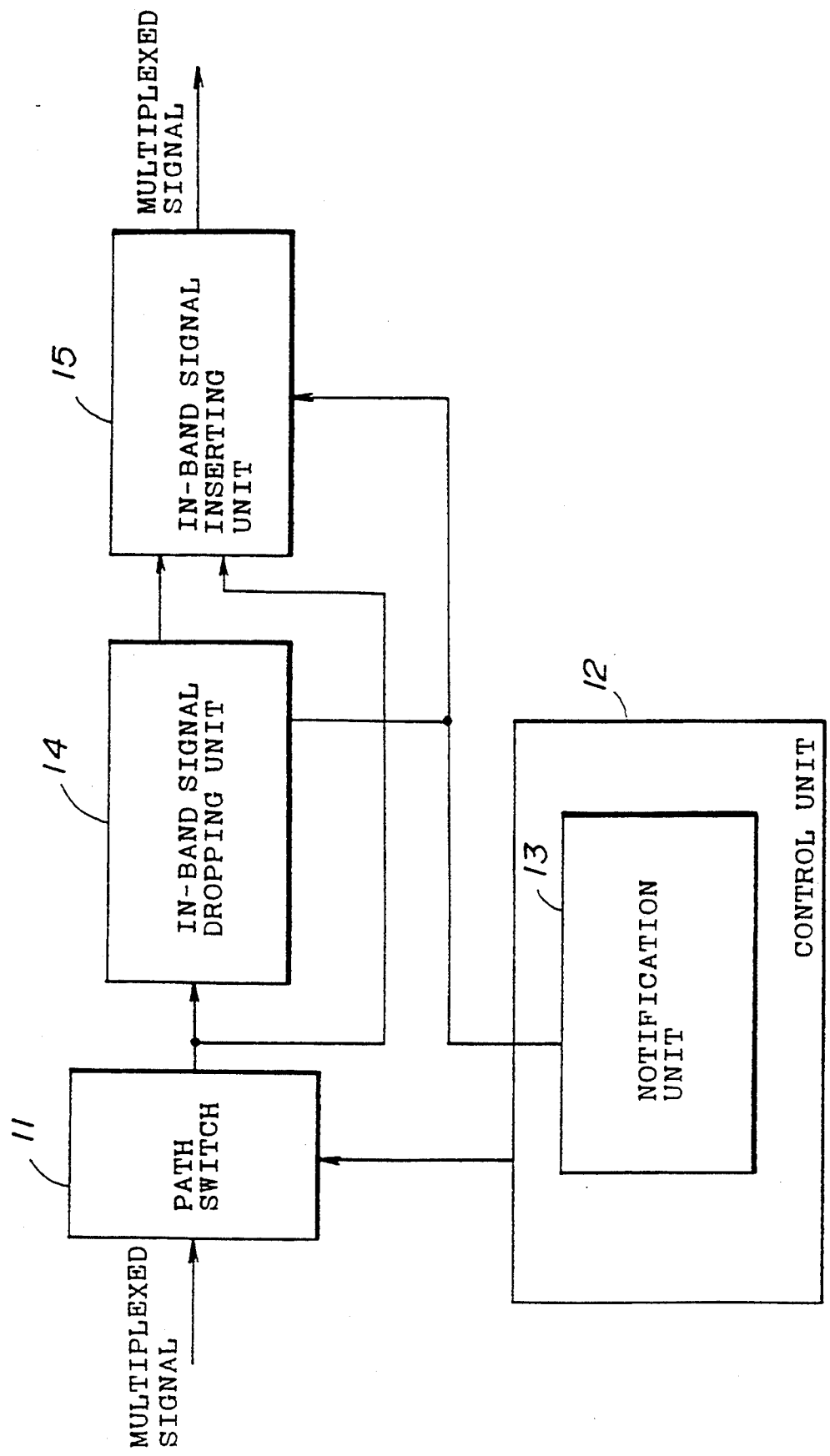

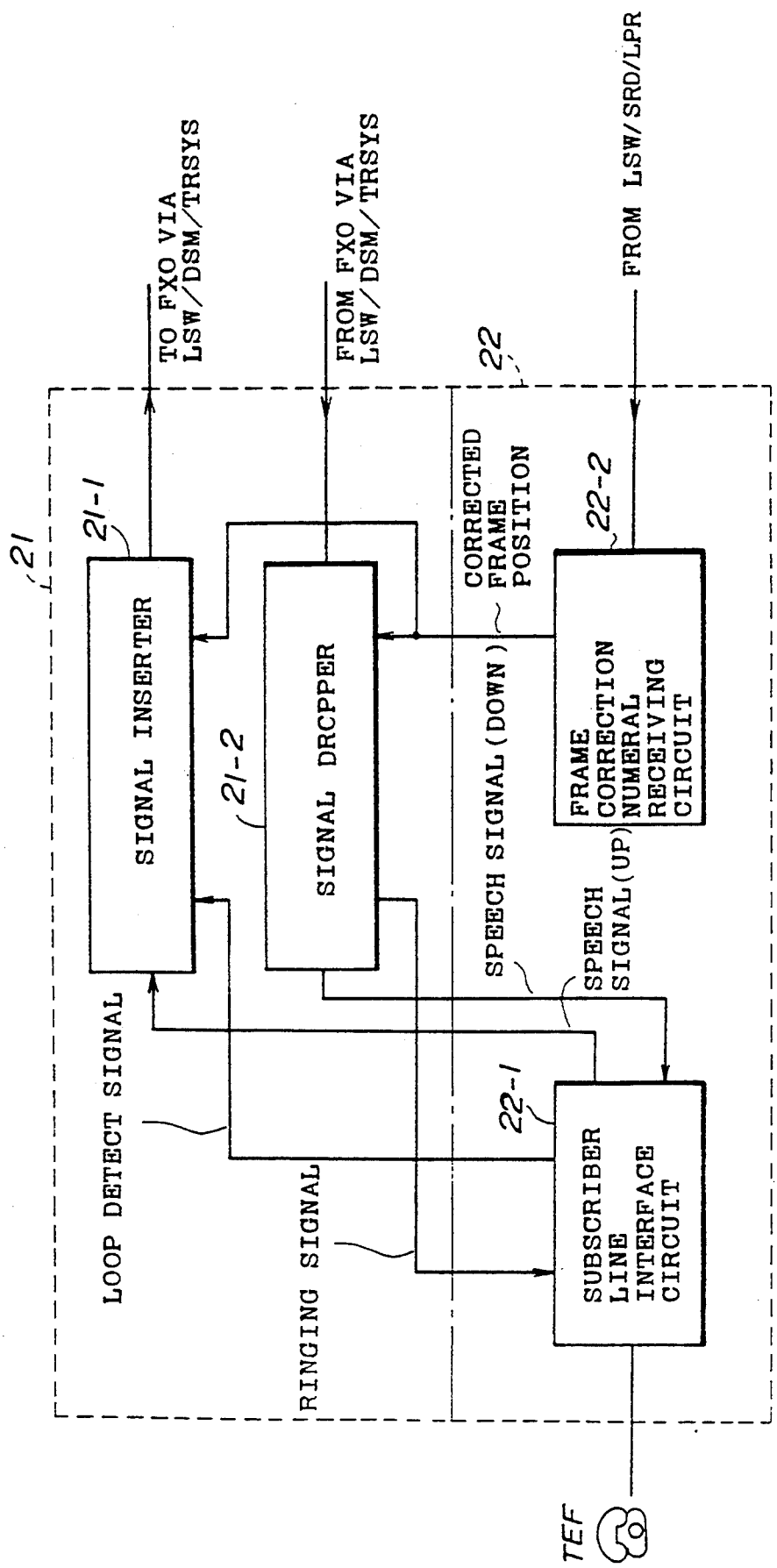

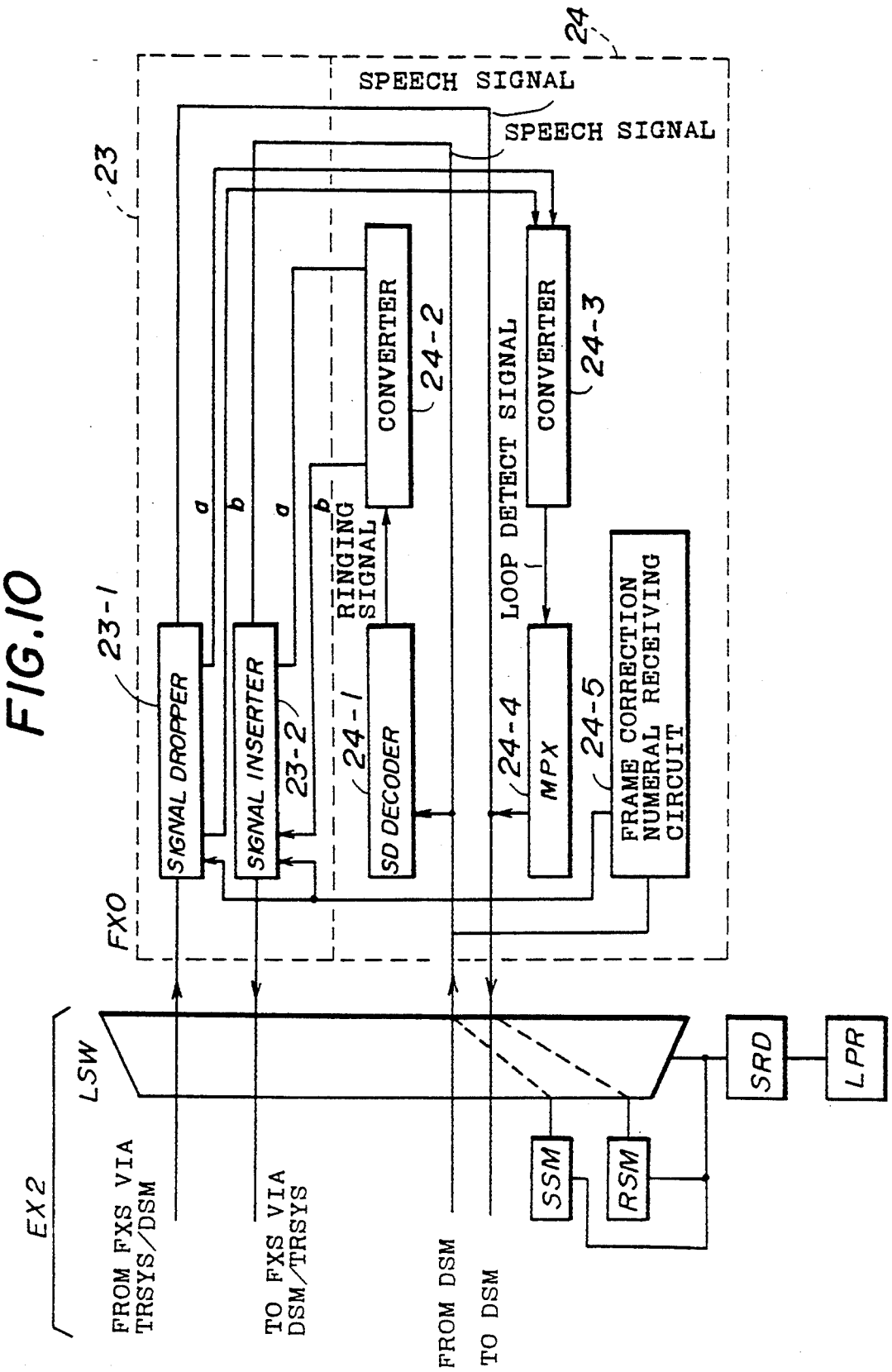

EXCHANGE SYSTEM HANDLING AN IN-BAND SIGNAL

This application is a continuation of application Ser. No. 07/757,904, filed Sep. 11, 1991, now abandoned.

BACKGROUND OF THE INVENTION

(1) Field of the Invention

The present invention generally relates to an exchange system having time switches and, more particularly, to an exchange system handling an in-band signal. An in-band signal is defined as a signal consisting of predetermined bits which are allocated in a PCM multiplexed signal transferred via a transmission path in order to transmit a line signal via the transmission line.

(2) Description of the Related Art

Recently, services presented to subscriber terminals have become more advanced. Thus, it is required that such advanced services be presented to subscriber terminals which are already coupled to the existing subscriber lines (or exchanges).

FIG. 1 is a block diagram of a communication system capable of presenting advanced services. The system shown in FIG.1 has exchange offices 3 and 5, both of which are connected to each other through a PCM transmission system 4. The exchange office 3 accommodates subscriber terminals 1 via subscriber lines 2, and the exchange office 5 accommodates subscriber terminals 9 via subscriber lines 10. Further, the exchange office 5 accommodates a pseudo subscriber circuit 8, which is connected to the exchange office 5 via a control line 6 and a subscriber line 7. Predetermined subscriber terminals among the subscriber terminals 1 connected to the exchange office 3 can receive a service presented by the exchange office 5 in the following way.

When the subscriber terminal 1 generates a call, the exchange office 3 creates a communication path A-A' between the subscriber line 2 and the transmission system 4, and informs the exchange office 5 of the generation of the call. The exchange office 5 has created a communication path B-B' between the transmission system 4 and the control line 6, and has activated the pseudo subscriber circuit 8 after the exchange office B restarts. It will be noted that the communication path B-B' is not created for each call but created on the basis of predetermined data (data about the specifically used line). The initial setting of the pseudo subscriber circuit 8 is carried out when the exchange office 5 restarts. The pseudo subscriber circuit 8 receives a speech signal and a line signal from the subscriber terminal 1 via the communication path A-A', the transmission system 4 and the communication path B-B'. The pseudo subscriber circuit 8 controls the subscriber line 7 in accordance with the line signal, so that the speech signal is transferred between the control line 6 and the subscriber line 7. That is, the exchange office 5 can execute the call processing procedure as if the subscriber terminal 1 is actually connected to the subscriber line 7. In this way, the subscriber terminal 1 can receive the service which is not provided by the office exchange 3.

Data (speech signal) is transferred on the transmission system 4 in a PCM 24 format, in which one multiframe consists of 12 consecutive frames, as shown in FIG. 2. Each of the 12 frames consists of 24 channels (time slots). Each channel consists of eight bits. The line signal transferred between the subscriber terminal 1 and the pseudo subscriber circuit 8 is transferred using the least significant bit (in-band signal) in each time slot of each of the sixth and twelfth frames 6F and 12F. The PCM-24 format shown in FIG. 2 is disclosed in, for example, Japanese Laid-Open Patent Application No. 64-18328.

As shown in FIG. 3, each of the exchange offices 3 and 5 has time switches #1 and #2, each of which is comprised of a memory. Information in the time slots (channels:CH) is alternately written into the memories #1 and #2 for every frame period. During operation, information is written into one of the memories #1 and #2, while information is read out from the other one of the memories #1 and #2. Thus, the order of frames obtained at the input sides of the memories #1 and #2 is the same as the order of frames obtained at the output sides thereof. As a result, in principle, the in-band signals placed in the specific frames can be exchanged in the same way as the speech signal.

However, the structure shown in FIG. 3 is not compact and simple because two memories are needed. In order to overcome this problem, an improved structure has been proposed in which a single time switch is used. However, there is a limitation regarding read timings of the single time switch. Thus, as will be described in detail later, there is a possibility that the in-band signal (least significant bits in the specific frames) may be located in a frame subsequent to the specific frame due to a delay in signal processing therein. The in-band signals which are not located in place cause various malfunctions of the system. For example, it becomes impossible to control the pseudo subscriber circuit 8 (FIG. 1).

SUMMARY OF THE INVENTION

It is a general object of the present invention to provide an improved exchange system handling an in-band signal in which the above-mentioned disadvantage is eliminated.

A more specific object of the present invention is to provide an exchange system in which the in-band signal can be switched by using a switch which creates communication paths having different delay times.

The above-mentioned objects of the present invention are achieved by an exchange system of a digital communication system comprising:

switch means for selectively connecting input time slots of the switch means to output time slots thereof, a multiplexed signal being input to the switch means via the input time slots and output to a next-stage system via the output time slots, the multiplexed signal having multiframes, each being composed of a plurality of consecutive frames, each of the frames including the input time slots, at least one specific frame being included in the consecutive frames, an in-band signal used for a predetermined control procedure on the digital communication system being placed in the input time slots of the specific frame, and paths formed between the input and output time slots having respective delay times based on combinations of the input and output time slots;

frame correction numeral determining means, coupled to the switch means, for determining a frame correction numeral corresponding to a time delay of a path which is actually formed by the switch means;

in-band signal dropping means, placed on an output side of the switch means and operatively coupled to the switch means and the frame correction numeral determining means, for dropping the in-band signal from the input time slots of a frame which lags behind the specific frame by the frame correction numeral; and in-band signal inserting means, operatively coupled to the switch means and the in-band signal dropping means, for inserting the in-band signal into the output time slots of the specific frame of a subsequent multiframe subsequent to a multiframe having the input time slots from which the in-band signal is dropped by the in-band signal dropping means.

The aforementioned objects of the present invention are also achieved by an exchange system of a digital communication system comprising:

switch means for selectively connecting input time slots of the switch means to output time slots thereof, a multiplexed signal being input to the switch means via the input time slots and output to a next-stage system via the output time slots, the multiplexed signal having multiframes, each being composed of a plurality of consecutive frames, each of the frames including the input time slots, at least one specific frame being included in the consecutive frames, an in-band signal used for a predetermined control procedure on the digital communication system being placed in the input time slots of the specific frame, and paths formed between the input and output time slots having respective delay times based on combinations of the input and output time slots;

frame correction numeral determining means, coupled to the switch means, for determining a frame correction numeral corresponding to a time delay of a path which is actually formed by the switch means;

in-band signal dropping means, placed at a stage prior to the switch means and operatively coupled to the switch means and the frame correction numeral determining means, for dropping the in-band signal from the input time slots of the specific frame; and in-band signal inserting means, operatively coupled to the switch means and the in-band signal dropping means, for inserting the in-band signal into the output time slots of a frame which is included in a subsequent multiframe subsequent to a multiframe having the input time slots from which the in-band signal is dropped by the in-band signal dropping means and which precedes the specific frame by the frame correction numeral and for outputting, as the multiplexed signal, a corrected multiplexed signal to the switch means.

BRIEF DESCRIPTION OF THE DRAWINGS

Other objects, features and advantages of the present invention will become more apparent from the following detailed description when read in conjunction with the accompanying drawings, in which:

FIGS. 5A through 5E are diagrams showing the relationships between an input time slot number, an internal time slot number and an output time slot number;

FIGS. 6A and 6B are diagrams showing a frame deviation generated by a switch;

FIG. 7A is a block diagram of a first preferred embodiment of the present invention;

FIG. 9A is a block diagram of a foreign exchange channel unit accommodated in a foreign exchange office shown in FIG. 8;

FIG. 10 is a block diagram of a foreign exchange channel unit accommodated in a control exchange office shown in FIG. 8;

DESCRIPTION OF THE PREFERRED EMBODIMENTS

A description will now be given of the aforementioned disadvantage of the prior art with reference to FIGS. 4 to 6B.

Figure 4:
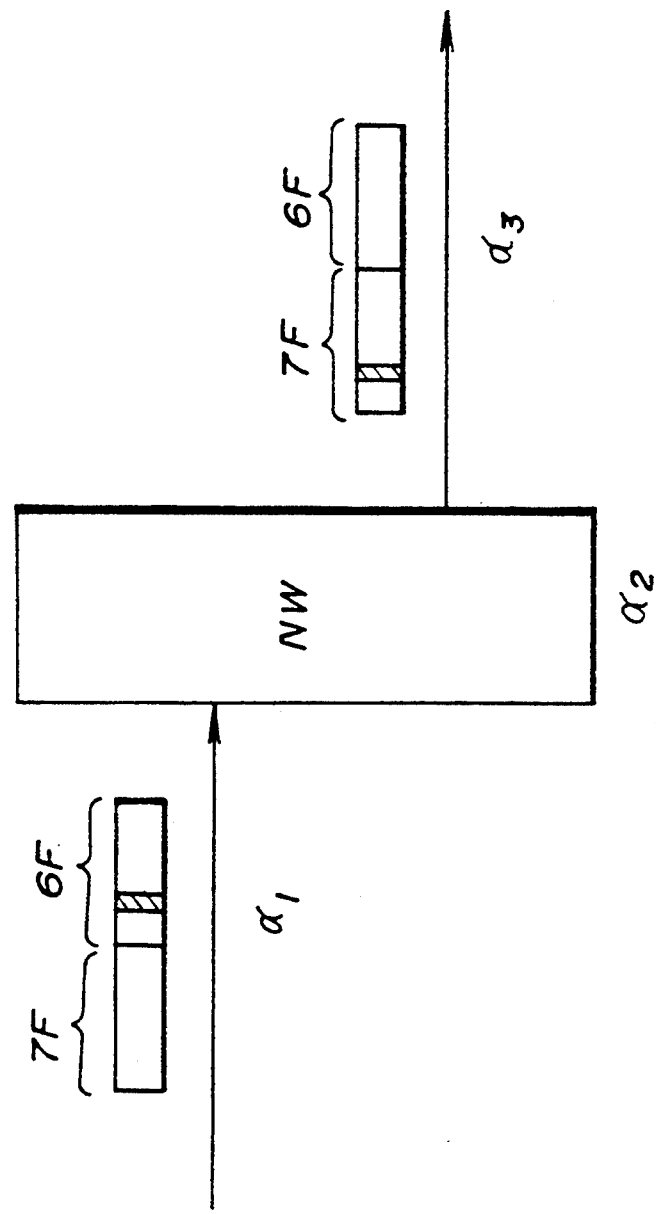
FIG. 4 is a block diagram showing a disadvantage of the conventional communication system shown in FIG. 1.

As shown in FIG. 4, a path switch NW comprising a single memory receives the sixth frame 6F including the in-band signal indicated by a hatched area and the seventh frame 7F. The path switch NW functionally has a primary time switch, a space memory and a secondary time switch. Then, the path switch NW outputs the sixth frame 6F in which the in-band signal is not included, and the seventh frame 7F having the in-band signal. That is, the in-band signal is not switched correctly. This is caused by the following factors.

Figure 5A:
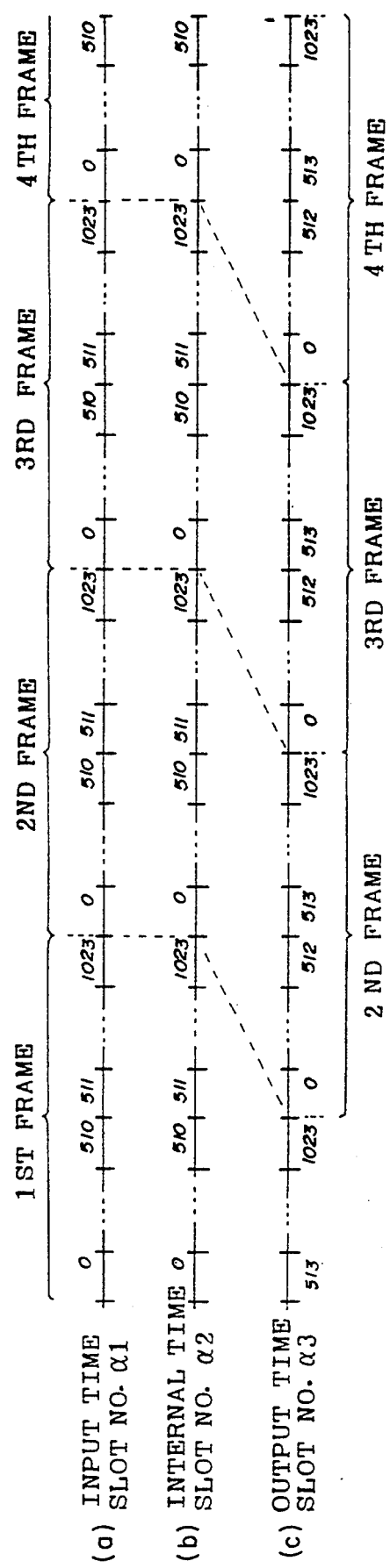

FIG. 5A shows the operation of the path switch NW shown in FIG. 4, assuming that the path switch NW handles 1024 time slots. FIG.5 A-(a) shows time slots on the input side of the path switch NW, FIG. 5A-(b) shows time slots in the path switch NW, and FIG. 5A-(c) shows time slots on the output side of the path switch NW. One frame consists of 1024 time slots. The path switch NW has an inherent delay time corresponding to 511 time slots (which correspond to approximately half the frame period) due to the circuit configuration of the path switch NW. The read timings of the path switch NW are determined depending on the a path formed in the path switch NW (combination of time slots in FIGS. 5A-(a), (b) and (c)) as well as the above mentioned inherent delay time. Thus, as shown in FIG. 6A, a delay time is generated based on an arithmetic relationship between the number of the time slot on the input side of the primary time switch (input time slot number $\alpha 1$ shown in FIG. 5A-(a)), the number of the internal time slot connecting the primary time switch and the space switch (internal time slot number $\alpha 2$ shown in FIG. 5A-(b)), and the number of the time slot of the secondary time switch (output time slot number $\alpha 3$ shown in FIG. 5A-(c)). As shown in FIG. 6A, the delay time generated in the path switch NW falls in a range between zero and a time corresponding to three frames.

As shown in FIG. 5B, when the input time slot number $\alpha 1$ is 0, the internal time slot number $\alpha 2$ is 0, and the output time slot number $\alpha 3$ is 513, $\alpha 1 \leqq \alpha 2 < 511$ and $(\alpha 2 + 513) \leqq \alpha 3$ are satisfied, so that there is no delay time (N=0).

As shown in FIG. 5C, when $\alpha 1 = 0$, $\alpha 2 = 1$ and $\alpha 3 = 513$, $\alpha 1 \leqq \alpha 2 < 511$ and $(\alpha 2 + 513) < \alpha 3$ are satisfied, so that there is a delay time corresponding to one frame (N=1).

As shown in FIG. 5D, when $\alpha 1 = 1, \alpha 2 = 0$ and $\alpha 3 = 512$, $\alpha 1 > \alpha 2$, $2 < 511$ and $(\alpha 2 + 513) > \alpha 3$ are satisfied, so that there is a delay time corresponding to two frames (N=2).

As shown in FIG. 5E, when $\alpha 1 = 513$, $\alpha 2 = 512$ and $\alpha 3 = 0$, $\alpha 1 > \alpha 2$, $\alpha 2 > 511$ and $(\alpha 2 - 511) < \alpha 3$ are satisfied, so that there is a delay time corresponding to three frames (N=3).

It should be noted that the relationship between the input time slots and the output time slots in an up highway is opposite to that in a down highway, even when the up and down highways are formed by the identical path. Thus, as shown in FIG. 6B, the delay times generated in the up highway are different from those generated in the down highway.

FIG. 7A is a block diagram showing an outline of a first preferred embodiment of the present invention. As shown, the first embodiment of the present invention comprises an in-band signal dropping unit 14, an in-band signal inserting unit 15 and a notification unit 13 provided in a control unit 12. The in-band signal dropping unit 14 and the in-band signal inserting unit 15 are provided on the output side of a path switch 11. A multiplexed input signal composed of consecutive multiframes is input to the path switch 11. Each of the multiframes includes in-band signals placed in a predetermined bit in each channel (time slot) of each specific frame, For example, the aforementioned PCM-24 signal has the in-band signal in each time slot (channel) in each of the sixth and twelfth frames 6F and 12F. The path switch 11 creates a path connecting the input time slot and the output time slot in accordance with a control signal from the control unit 12. As has been described previously with reference to FIGS. 5A through 5E, 6A and 6B, the path created by the path switch 11 has a time delay corresponding to the number of frames based on the combination of the input and output time slots which are actually connected to each other. The control unit 12 generates the control signal, which controls the time-based order of output time slots with respect to the input time slots.

The notification unit 13 of the controller unit 12 determines a frame correction numeral indicating the number of frames based on the combination of the input and output time slots, and notifies the in-band signal dropping unit 14 and the in-band signal inserting unit 15 of the frame correction numeral. A frame correction unit is composed of the notification unit 13, the in-band signal dropping unit 14 and the in-band signal inserting unit 15. The frame correction numeral is determined based on the relationships shown in FIGS. 6A and 6B. For example, the frame correction numeral is zero when the input time slot number $\alpha 1$, the internal time slot number $\alpha 2$ and the output time slot number $\alpha 3$ satisfies $\alpha 1 \leqq \alpha 2 < 511$ and $(\alpha 2 + 513) \leqq \alpha 3$. The in-band signal dropping unit 14 receives the multiplexed output signal from the path switch 11 and drops the in-band signal from each output time slot of a frame which lags behind the specific frame by the frame correction numeral. This operation is carried out for each specific frame. In the PCM-24 format, two specific frames 6F and 12F are included in one multiframe. The in-band signal inserting unit 15 inserts the dropped in-band signal into each output time slot of each specific frame in a subsequent multiframe.

Figure 7B:
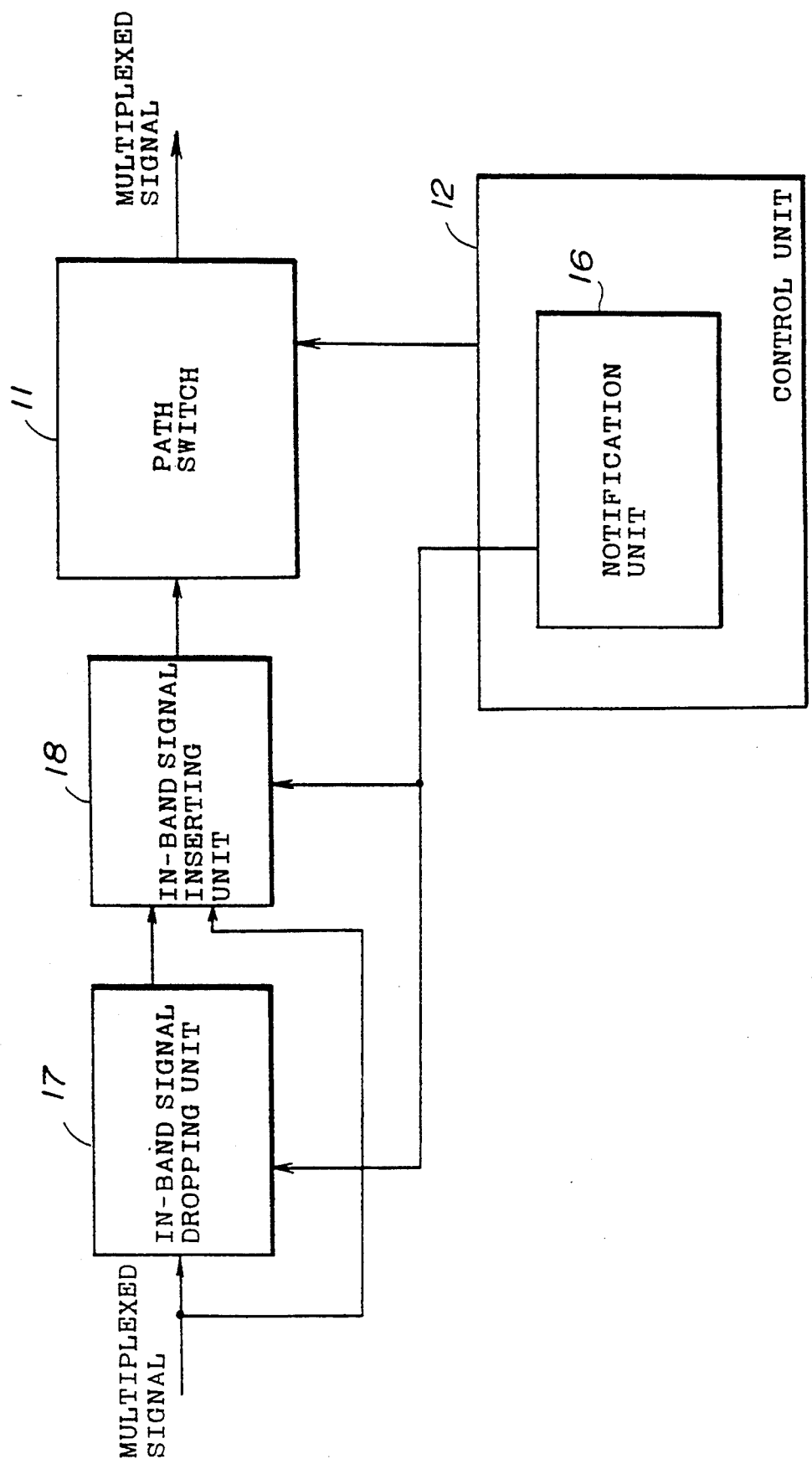
FIG. 7B is a block diagram of a second preferred embodiment of the present invention.

FIG. 7B is a block diagram of a second preferred embodiment of the present invention. As shown in FIG. 7B, an in-band signal dropping unit 17 and an in-band signal inserting unit 18 are provided on the input side of the path switch 11. The control unit 12 has a notification unit 16, which generates a control signal controlling the time-based order of output time slots of the path switch 11 with respect to the input time slots thereof. The control signal indicates the above-mentioned frame correction numeral. The in-band signal dropping unit 17 receives a multiplexed input signal composed of multiframes, and drops the in-band signal from each time slot of the specific frame. This operation is carried out for each specific frame. The in-band signal inserting unit 18 inserts the dropped in-band signal into each time slot of a frame which precedes, by the frame correction numeral, the specific frame of a subsequent multiframe. A frame correction unit is composed of the notification unit 16, the in-band signal dropping unit 17 and the in-band signal inserting unit 18.

Figure 8:
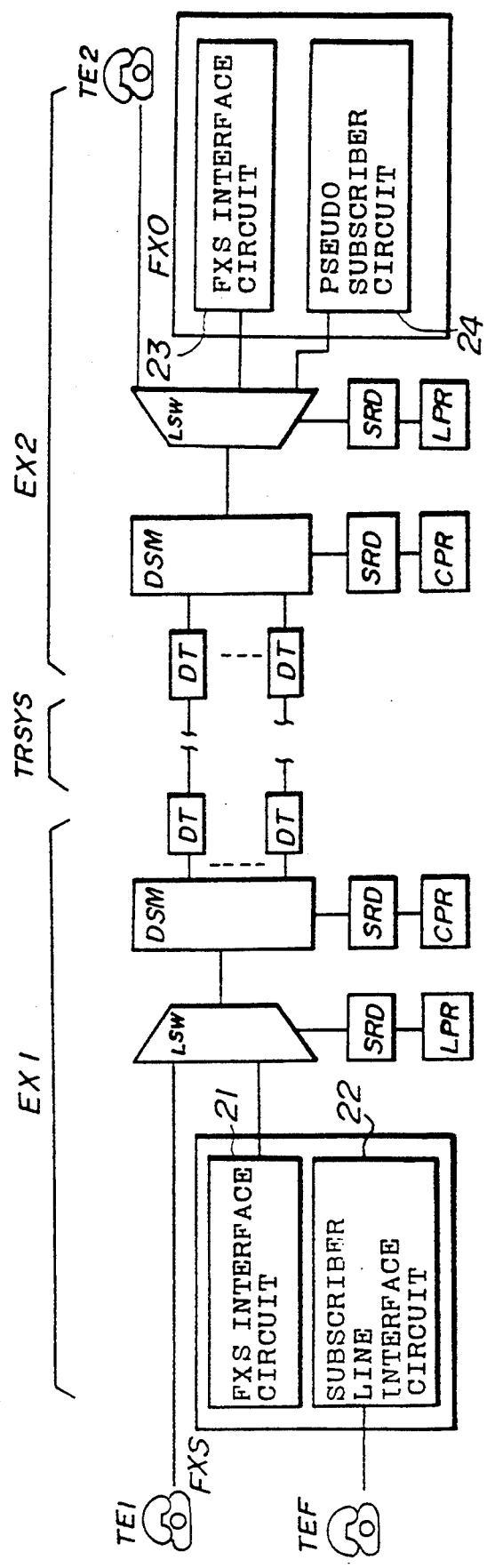
FIG. 8 is a block diagram of a communication system to which the present invention is applied.

FIG. 8 is a block diagram of a communication system to which the present invention is applied. The communication system shown in FIG. 8 includes a foreign exchange office EX1, a PCM transmission system TRSYS and a control exchange office EX2. Each of the exchange offices EX1 and EX2 includes a line switch LSW, a signal receiver/driver SRD, a line processor LPR, a digital switch module DSM, a signal receiver/driver SRD, a call processor CPR and digital terminals DT. The exchange office EX1 accommodates a subscriber terminal TE1 and a foreign subscriber terminal TEF. The subscriber terminal TE1 is connected to the line switch LSW of the exchange office EX1, and the foreign subscriber terminal TEF is coupled to the line switch LSW via a channel unit FXS. The foreign subscriber terminal TEF can receive services presented by the exchange office EX2 as if it were a terminal accommodated in the exchange office EX2. The channel unit FXS includes an FXO (Foreign Exchange Office) interface block 21 and a subscriber line interface (circuit) block 22. The exchange office EX2 accommodates a subscriber terminal TE2 and a foreign exchange channel unit FXO. As shown in FIG. 8, the channel unit FXO includes an FXS interface block 23 and a pseudo subscriber block 24. When the terminal TEF utilizes a service presented by the exchange office EX2, it is coupled thereto.

Figure 1:
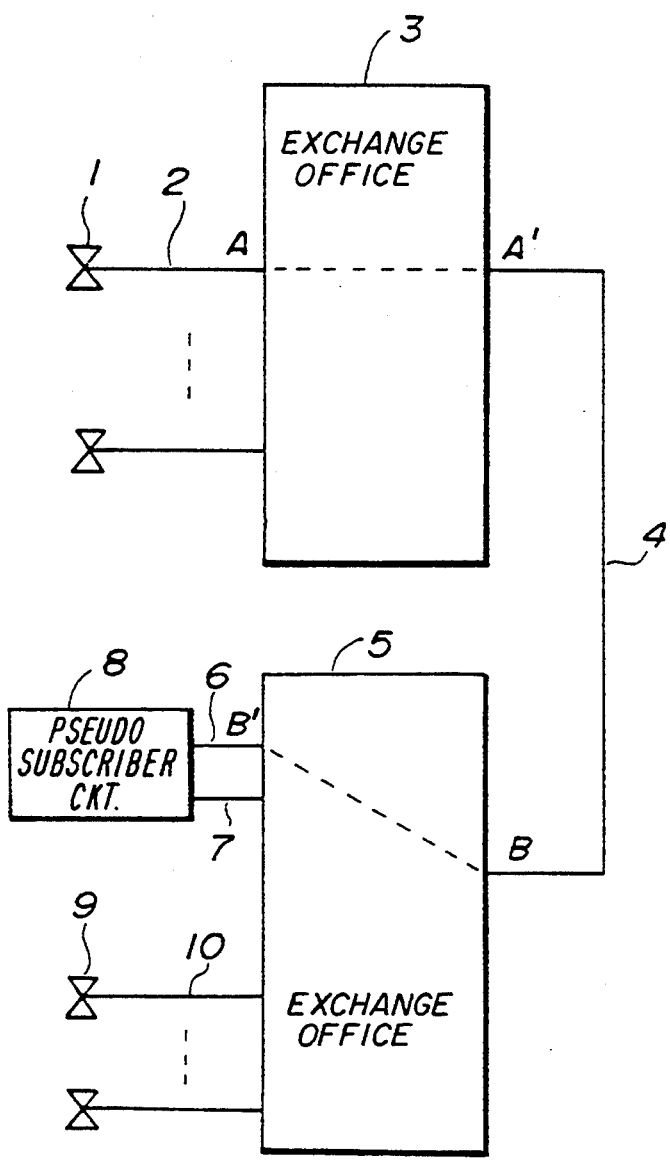
FIG. 1 is a block diagram of a conventional communication system capable of an advanced service.
Figure 2:
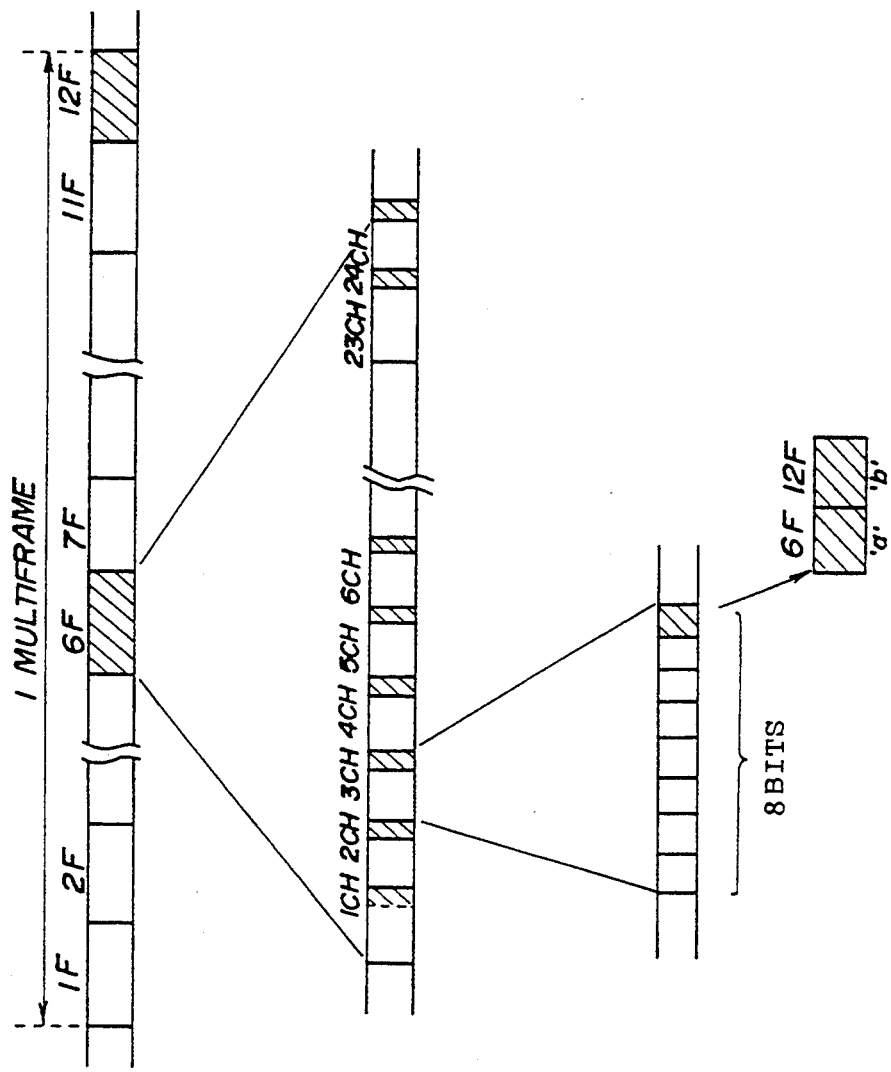
FIG. 2 is a block diagram of a PCM-24 format.
Figure 3:
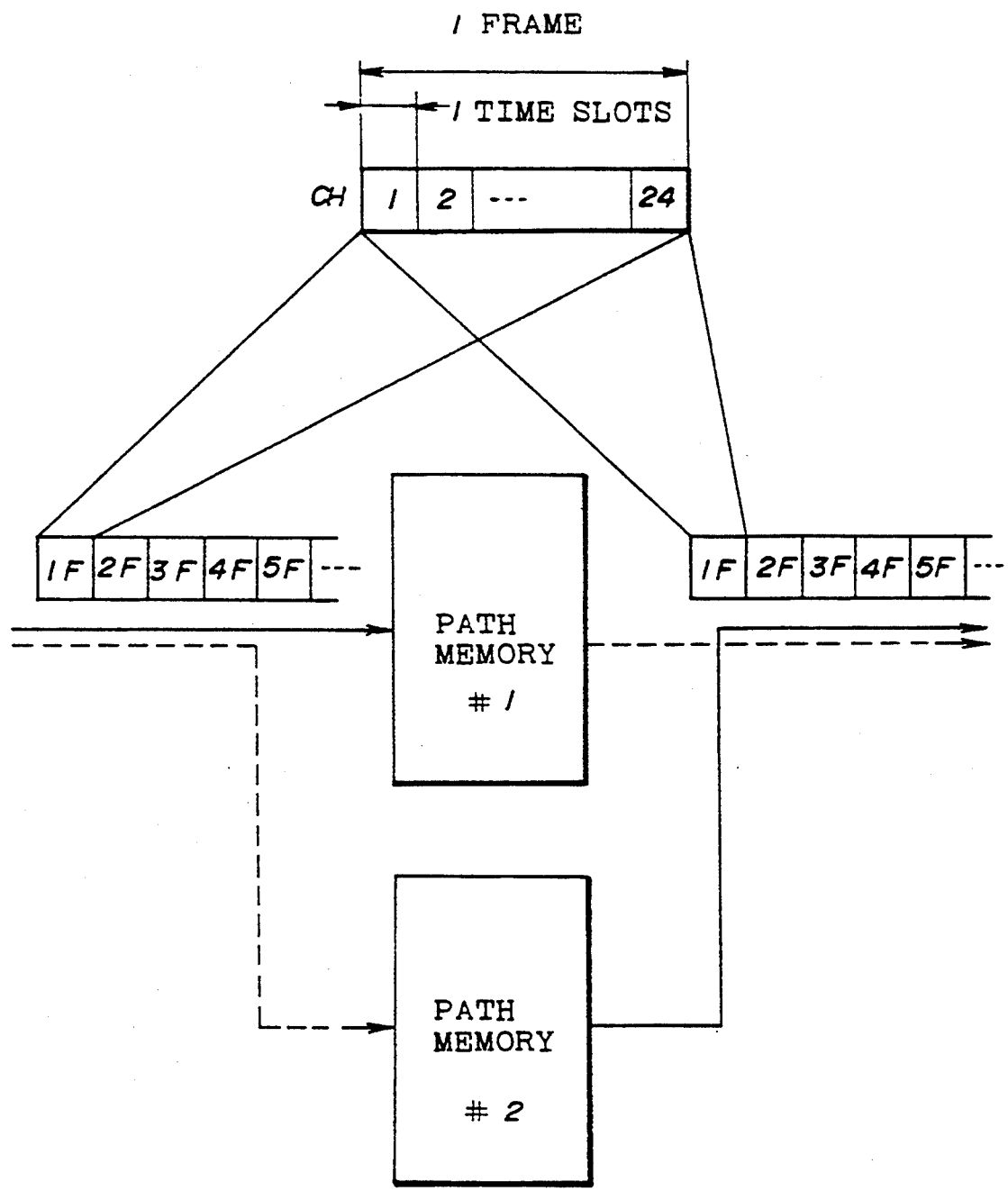
FIG. 3 is a block diagram showing the operation of a time switch.

The transmission system TRSYS transfers data in the PCM-24 format as shown in FIG. 2. The transmission system TRSYS includes, for example, only a transmission line, or an exchange office provided in the transmission line.

The structure shown in FIG. 7A can be provided on the output side of each of the digital switch modules DSM and the output side of each of the line switches LSW. The structure shown in FIG. 7B can be provided on the input side of each of the digital switch modules DSM and the input side of each of the line switches LSW. The real communication system shown in FIG. 8 does not need all the above-mentioned combinations of positions where the structures shown in FIGS. 7A and 7B can be located.

For example, the communication system shown in FIG. 8 includes the Structure shown in FIG. 7A on the output side of each of the digital switch modules DSM and the structure shown in FIG. 7B on the input side of each of the line switches LSW.

FIG. 9A is a block diagram of the channel unit FXS in the exchange office EX1. The FXO interface block 21 is composed of a signal inserter 21-1 and a signal dropper 21-2, and the subscriber line interface block 22 is composed of a subscriber line interface circuit 22-1 and a frame correction numeral receiving circuit 22-2. The signal inserter 21-1 and the signal dropper 21-2 are coupled to the channel unit FXO via the exchange office EX1, the transmission system TRSYS and the exchange office EX2. A speech signal from the circuit 22-1 is input to the signal inserter 21-1, and a speech signal from the signal dropper 21-2 is input to the circuit 22-1.

The foreign subscriber terminal TEF is connected to the subscriber line interface circuit 22-1, which detects ON-hook/OFF-hook states. In the ON-hook state, there is no current loop. In the OFF-hook state, a current loop including the foreign subscriber terminal TEF is formed. The subscriber line interface circuit 22-1 generates two bits 'a' and 'b' which show the state of the current loop. The bits 'a' and 'b' are as shown in FIG. 2. When the circuit 22-1 detects the OFF-hook state, it outputs a loop detection signal to the signal inserter 21-1. The frame correction numeral receiving circuit 22-2 receives the aforementioned frame correction numeral from the line processor LPR of the exchange office EX1, and outputs a corrected frame position to the signal inserter 21-1 and the signal dropper 21-2. The signal inserter 21-1 respectively inserts bits 'a' into the least significant bits of the frame specified by the corrected frame position. The signal dropper 21-2 respectively drops the least significant bits from the frames specified by the corrected frame position, and converts the dropped least significant bits to a ringing signal, which is input to the subscriber line interface circuit 22-1.

Figure 9B:
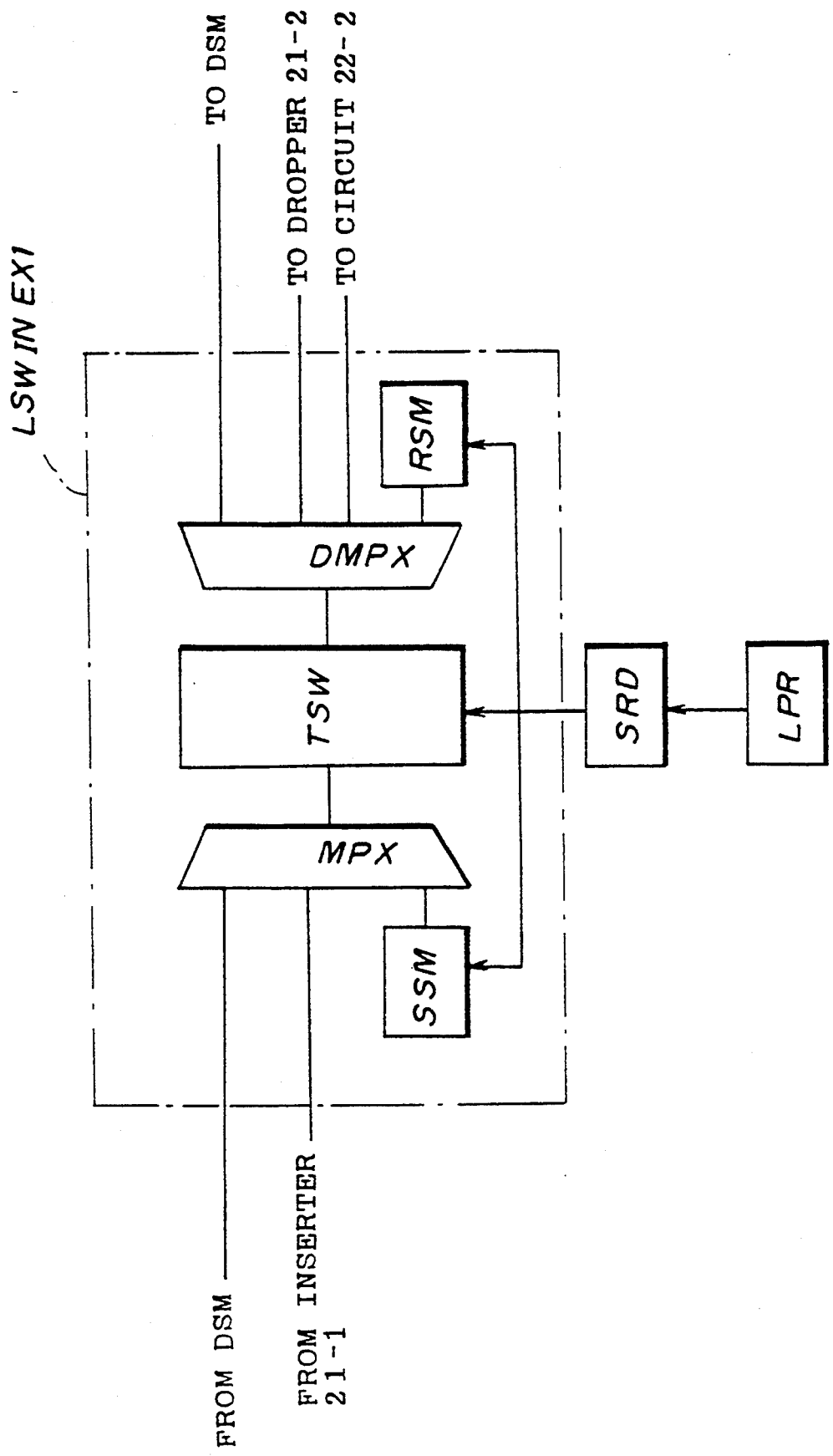
FIG. 9B is a block diagram of a line switch shown in FIG. 8.

FIG. 9B is a block diagram of the line switch LSW of the exchange office EX1. The inserter 21-1 shown in FIG. 9A is connected to a multiplexer MPX of the line switch LSW, and the dropper 21-2 is connected to a demultiplexer DMPX of the line switch LSW. The frame correction numeral receiving circuit 22-2 is connected to the demultiplexer DMPX. A time switch TSW is connected between the multiplexer MPX and the demultiplexer DMPX. A send signal memory SSM is connected to the multiplexer MPX, and a receive signal memory RSM is connected to the demultiplexer DMPX. The line processor LPR determines the frame correction numeral between the input and output time slots of the time switch TSW, and sends the frame correction numeral to the send signal memory SSM via the signal receiver/driver SRD. The frame correction numeral is written into a send signal memory block formed in the send signal memory SSM. During a system initialization, the send signal memory block is connected to the frame correction numeral receiving circuit 22-2 (FIG. 9A) via a path having the send signal memory SSM, the multiplexer MPX, the time switch TSW, the demultiplexer DMPX and the frame correction numeral receiving circuit 22-2.

FIG. 10 is a block diagram of the channel unit FXO accommodated by the exchange office EX2. The FXS interface circuit 23 of the channel unit FXO is composed of a signal dropper 23-1 and a signal inserter 23-2, and the pseudo subscriber circuit 24 is composed of an SD (Send Data) decoder 24-1, a converter 24-2, a converter 24-3, a multiplexer 24-4 and a frame correction numeral receiving circuit 24-5. As shown in FIG. 10, a send signal memory SSM and a receive signal memory RSM are coupled to the line switch LSW of the exchange office EX2. The line processor LPR of the exchange office EX2 writes send data SD into the send signal memory SSM via the signal receiver/driver SRD. The send data SD written into the send signal memory SSM is transferred to the channel unit FXO via a predetermined time slot. The SD decoder 24-1 decodes the send data SD in the predetermined time slot, and outputs a ringing signal to the converter 24-2, which generates the bits 'a' and 'b' forming the in-band signals from the received ringing signal. The frame correction numeral receiving circuit 24-5 receives the frame correction numeral, which is output to the signal dropper 23-1 and the signal inserter 23-2. The signal inserter 23-2 inserts the bit 'a' into the least significant bit of the frame having a corrected frame position, and inserts the bit 'b' into the least significant bit of the frame which is displaced, by a predetermined number of frames, from the frame in which the bit 'a' is inserted.

The signal dropper 23-1 drops the bit 'a' from the least significant bit of the frame having the corrected frame position, and drops the bit 'b' from the least significant bit of the frame which is displaced, by the above-mentioned predetermined number of bits, from the frame from which the bit 'a' is dropped. The dropped bits 'a' and 'b' are sent to the converter 24-3, which generates a loop detection signal from the received bits 'a' and 'b'. The multiplexer 24-4 inserts the loop detection signal into the aforementioned predetermined time slot. The loop detection signal is then written into the receive signal memory RSM via the line switch LSW. The line processor LPR of the exchange office EX2 periodically scans the contents of the receive signal memory RSM, and detects the ON-hook/OFF-hook states of the foreign subscriber terminal TEF accommodated in the channel unit FXS.

Figure 11:
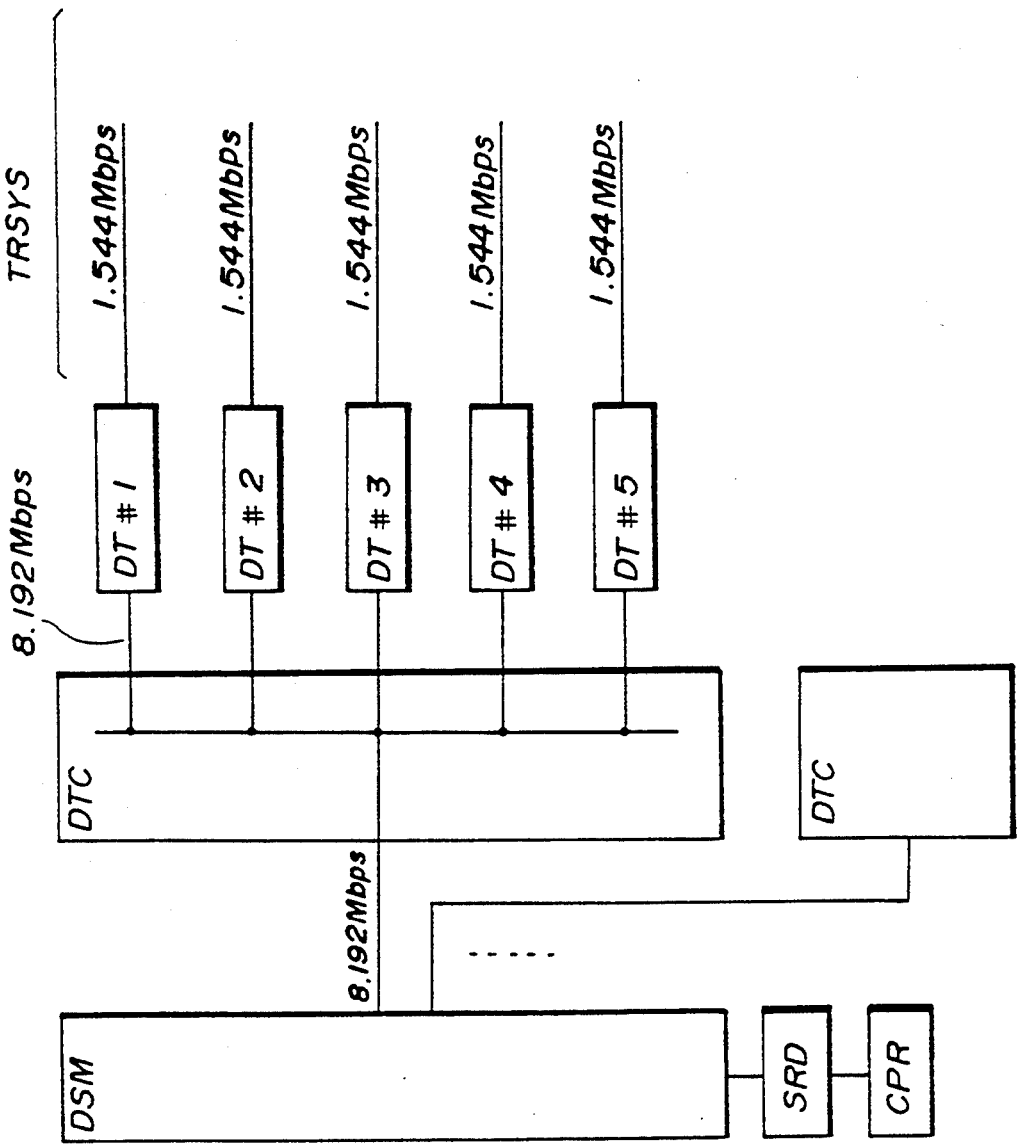
FIG. 11 is a block diagram of a digital terminal common unit used in the communication system shown in FIG. 8.

Although not shown in FIG. 8 for the sake of simplicity, as shown in FIG. 11, a digital terminal common unit DTC is provided between the digital switch module DSM and five data terminals DT#1–DT#5. The digital terminal common unit DTC is connected to the digital switch module DSM via a highway which has a bit rate of 8.192 Mbps which corresponds to 4×30 PCM channels (equal to 120 PCM channels). The digital terminal common unit DTC is connected to the five digital terminals DT#1–DT#5 via respective 8.192 Mbps highways. A 1.544 Mbps transmission line, which corresponds to 24 PCM channels, extends from each of the digital terminals DT#1–DT#5. The five 1.544 Mbps transmission lines correspond to 120 PCM channels. Each of the digital terminals DT#1–DT#5 functions as an interface between 30 PCM channels and 24 PCM channels.

Figure 12A:
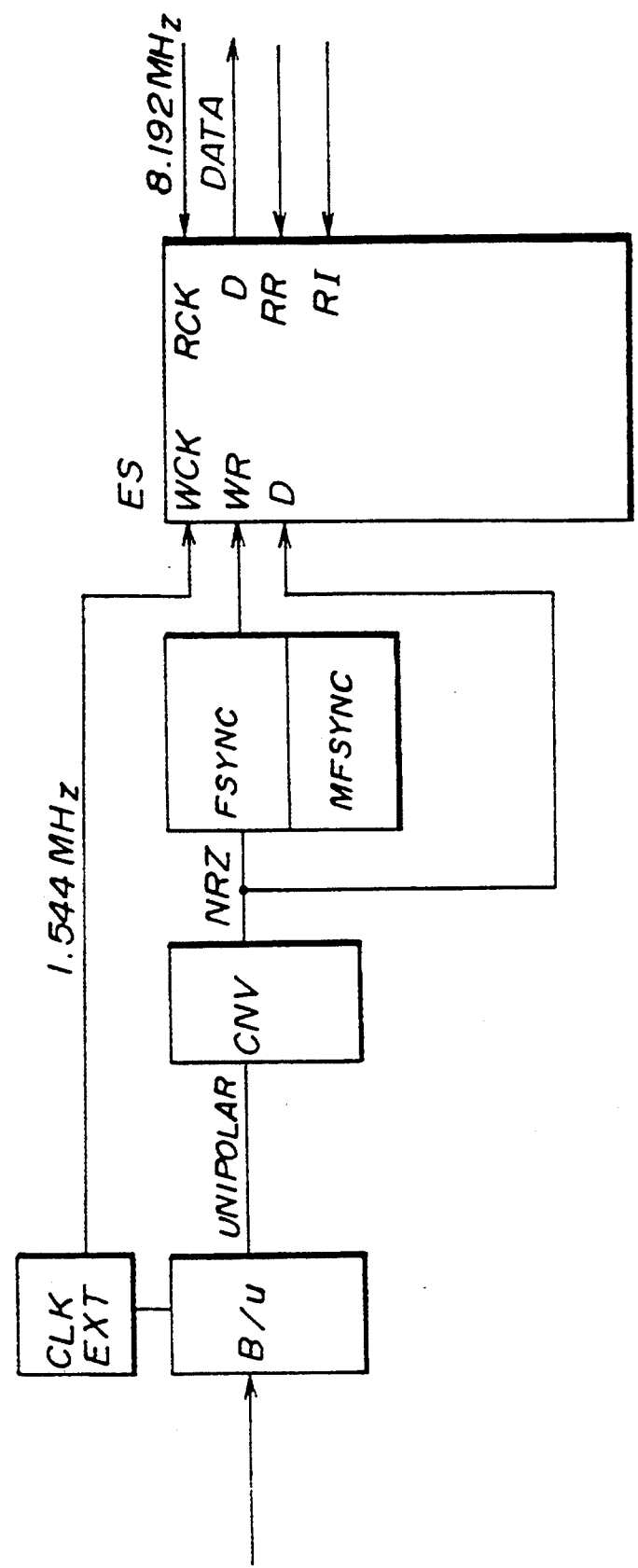
FIG. 12A is a block diagram of a digital terminal shown in FIG. 8.

FIG. 12A shows the structure of each digital terminal. The digital terminal shown in FIG. 12A is composed of a bipolar/unipolar translator B/U, a clock extraction circuit CLKEXT, a code converter CNV, a frame synchronizing circuit FSYNC, a multiframe synchronizing circuit MSYNC, and an elastic store memory ES. Bipolar data transferred from the digital switch module DSM via the 8.192 Mbps transmission line is input to the bipolar/unipolar translator B/U, which changes the bipolar data to the unipolar data. The unipolar data is supplied to the clock extraction circuit CLKEXT and the code converter CNV. The clock extraction circuit CLKEXT generates a 1.544 MHz clock signal from the unipolar data. The 1.544 MHz clock signal is input, as a write clock signal, to a write clock terminal WCK of the elastic store memory ES. The code converter CNV generates NRZ (Non Return to Zero) data from the unipolar data from the bipolar/unipolar translator B/U. The NRZ data is input to the frame synchronizing circuit FSYNC, the multiframe synchronizing circuit MSYNC and a data terminal D of the elastic store memory ES. The elastic store memory ES receives an 8.192 MHz clock signal, a read ready signal and a read inhibit signal from terminals RCK, RR and RI, respectively. These signals are generated and output by the corresponding digital terminal common unit DTC.

Figure 12B:
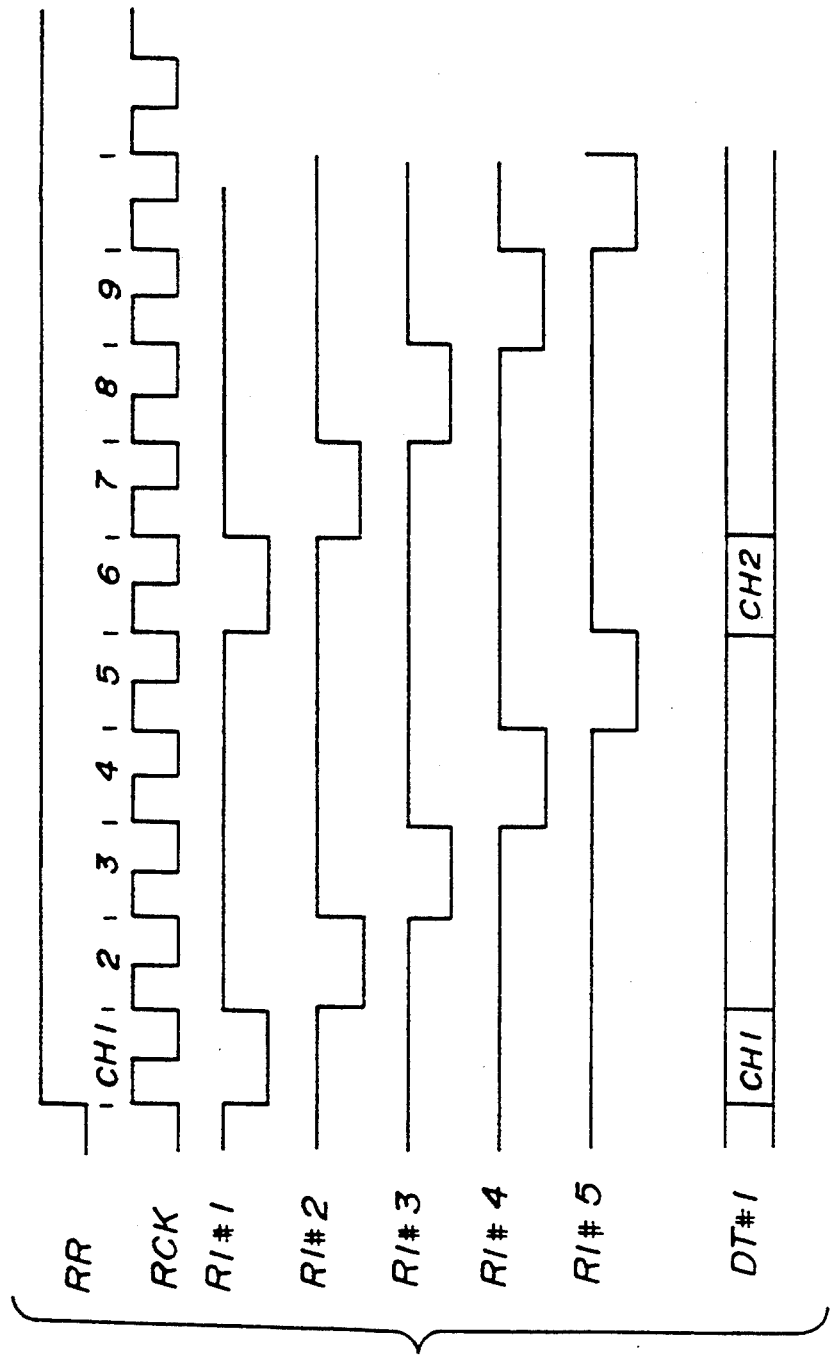
FIG. 12B is a time chart showing the operation of the digital terminal shown in FIG. 12A.

The NRZ data is written into the elastic store memory ES in synchronism with the write clock WCK from the timing specified by the signal WR. The elastic store memory ES has a storage capacity equal to one frame (which corresponds to 193 bits). Data is read out from the elastic store memory ES via the terminal D, as shown in FIG. 12B. The data is read out from the elastic store memory in synchronism with the read clock RCK from the timing specified by the signal RR. As shown in FIG. 12B, the signals RI#1–RI#5 respectively applied to the terminals RR of the five digital terminals DT#1–DT#5 have different timings. At one time, only one of the signals RT#1–RT#5 is maintained in an active state (low level). Channel #1 of the digital terminal DT#1 is located at channel CH1 of an 8.192 MHz frame. Channel #1 of the digital terminal DT#2 is located at channel CH2 of the 8.192 MHz frame. Channel #1 of the digital terminal DT#3 is located at channel CH3 of the 8.192 MHz frame. Channel #1 of the digital terminal DT#4 is located at channel CH4 of the 8.192 MHz frame. Channel #1 of the digital terminal DT#5 is located at channel CH5 of the 8.192 MHz frame. Channel #2 of the digital terminal DT#1 is located at channel #6 of the 8.192 MHz frame.

Figure 13:
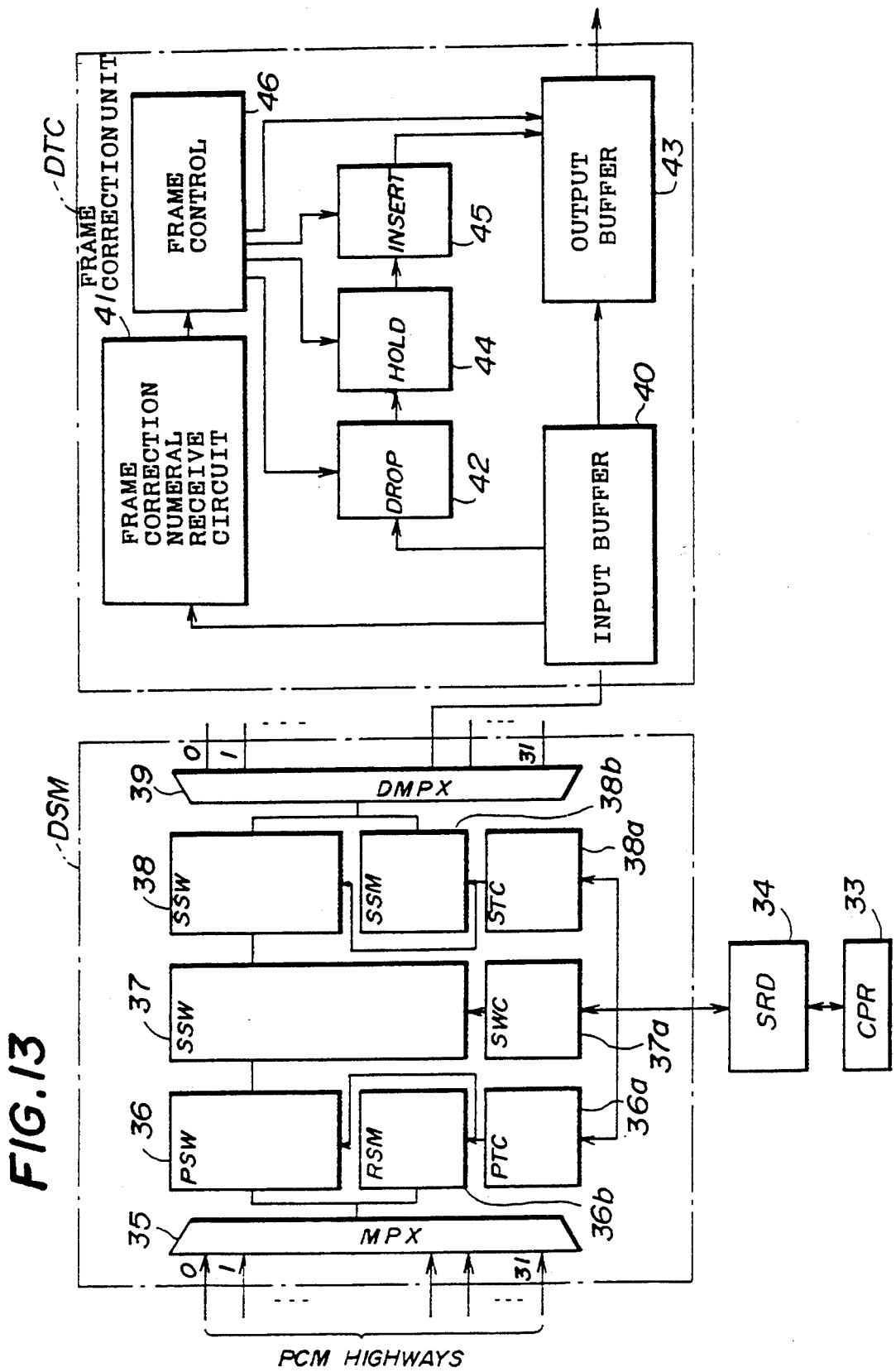
FIG. 13 is a block diagram of a digital switch module shown in FIG. 8 and a frame correction unit provided in the digital terminal common unit shown in FIG. 11.

FIG. 13 shows the structure of the digital switch module DSM and a frame correction unit which is formed in the digital terminal common unit DTC and provided for each specific channel in which the in-band signal is inserted. As shown in FIG. 13, 32 PCM highways extending from the line switch LSW are connected to a multiplexer (MPX) 35, which derives multiplexed PCM signal therefrom. The multiplexed signal is input to a primary time switch (PSW) 36 and a receive signal memory (RSM) 36b, both of which are controlled by a primary time switch controller (PTC) 36a. The receive signal memory 36b functions as a time switch. The primary time switch 36 and the receive signal memory 36b operate in a random write/sequential read way. The controller 36a controls write timings of the primary time switch 36 and the receive signal memory 36b. Data read out from the primary time switch 36 or the receive signal memory RSM is input to a space switch 37, which is controlled by a space switch controller 37a. The data read out from the space switch 37 is input to a secondary time switch (SSW) 38, which is connected to a demultiplexer (DMPX) 39. A send signal memory (SSM) 38b, which functions as a time switch, is also connected to the demultiplexer 39. A secondary time switch controller 38a controls the secondary time switch 38 and the send signal memory 38b. The data from the space switch 37 is sequentially written into the secondary time switch 38, and read out therefrom under the control of the secondary time switch controller 38a. Data is also read out from the send signal memory 38b under the control of the secondary time switch controller 38a. The data read out from the secondary time switch 38 and the send signal memory 38b are demultiplexed by the demultiplexer 39, which generates 32 PCM signals. The aforementioned call processor CPR and the signal receiver/driver SRD are given reference numerals 33 and 34, respectively. The call processor 33 generates control information necessary to a call processing procedure. The control information is distributed to the primary time switch controller 36a, the space switch controller 37a and the secondary time switch controller 38a.

Figure 14:
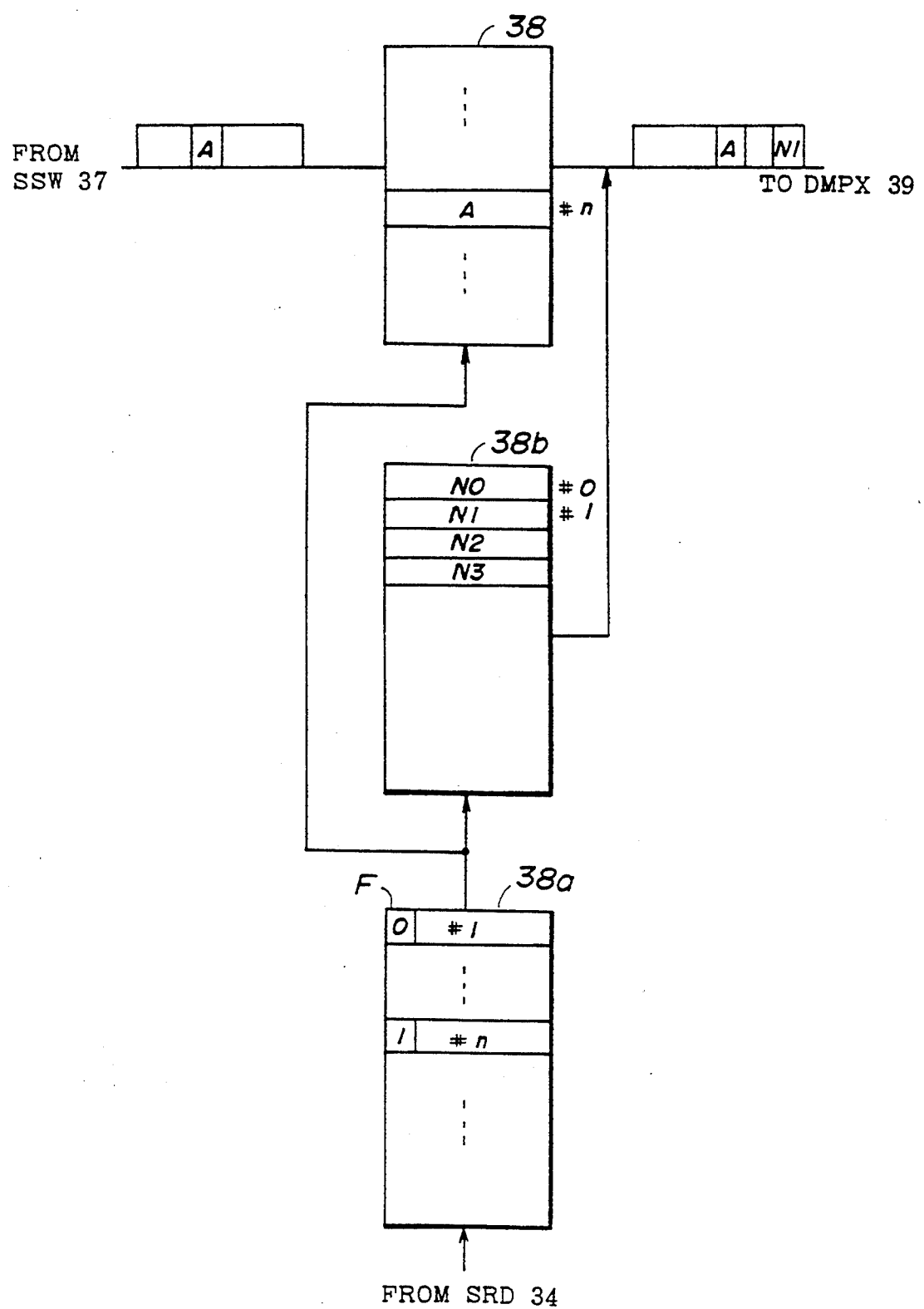
FIG. 14 is a block diagram showing a procedure for sending a frame correction numeral to the digital terminal common unit shown in FIG. 13.

FIG. 14 is a block diagram of the operation of the secondary time switch 38, the send signal memory 38b and the second time switch controller 38a. The data (time slots) from the space switch 37 are sequentially written into the secondary time switch 38. The time slots read out from the secondary time switch 38 are specified by the secondary time switch controller 38a. The send signal memory 38b stores frame correction numerals N0 (=0), N1 (=1), N2 (=2) and N3 (=3) as defined in FIG. 6A. The frame correction numeral which is to be read out from the send signal memory 38b is specified by the secondary time switch controller 38a. As shown in FIG. 14, each time slot stored in the secondary time switch controller 38a is assigned a flag F, which has a value of either '1' or '0'. Each time slot to which flag '1' is added is related to the secondary time switch 38, and each time slot to which flag '0' is added is related to the send signal memory 38b. For example, the frame correction numeral is placed at the first time slot.

In order to create a path in the digital switch module DSM, the call processor 33 (FIGS. 11 and 13) obtains the input time slot number $\alpha 1$ and the output time slot number $\alpha 3$, and hunts an idle internal time slot number $\alpha 2$ connecting the primary time switch 36 and the space switch 37. The call processor 33 respectively sends the time slot numbers $\alpha 1$, $\alpha 2$ and $\alpha 3$ to the controllers 36a, 37a and 38a via the signal receiver/driver 34. Further, the call processor CPR determines the frame correction numeral based on the input time slot number $\alpha 1$ and the output time slot number $\alpha 3$.

Returning now to FIG. 13, the digital terminal common unit DTC has a frame correction unit, which is made up of an input buffer circuit 40, a frame correction numeral receiving circuit 41, an in-band signal dropping circuit 42, an output buffer circuit 43, an in-band signal hold circuit 44, an in-band signal inserting circuit 4.5, and a frame control circuit 46. The frame correction numeral receiving circuit 41 receives the frame correction numeral via the input buffer circuit 40, and outputs the frame correction numeral to the frame control circuit 46. Then, the frame control circuit 46 outputs the frame correction numeral and the predetermined time slots of the specific frames into which the in-band signals are inserted. The frame control circuit 46 can be informed of information about the predetermined time slots of the specific frames via the send signal memory, the demultiplexer 39, the input buffer circuit 40 and the frame correction numeral receiving circuit 41.

The in-band signal dropping circuit 42 extracts the in-band signal from a frame which is located after (i.e., displaced from) the specific frame being considered by an amount defined by the frame correction numeral. That is, when the specific frame being considered is the ith frame and the frame correction numeral is 2, the in-band signal dropping circuit 42 extracts the in-band signal from the (i+2)th frame.

The dropped in-band signal is held in the in-band signal hold circuit 44 during a period specified by the frame control circuit 46. The in-band signal inserting circuit 45 reads out the in-band signal from the in-band signal hold circuit 44, and inserts it into the ith frame in a multiframe which is subsequent to the multiframe from which the in-band signal was dropped. The in-band signal is then output to the related digital terminal DT via the output buffer circuit 43. Meanwhile, the time slots other than the time slots of each specific frame in which the in-band signal is located pass through the input buffer circuit 40 and the output buffer circuit 43, and are sent to the related digital terminal DT.

Figure 15:
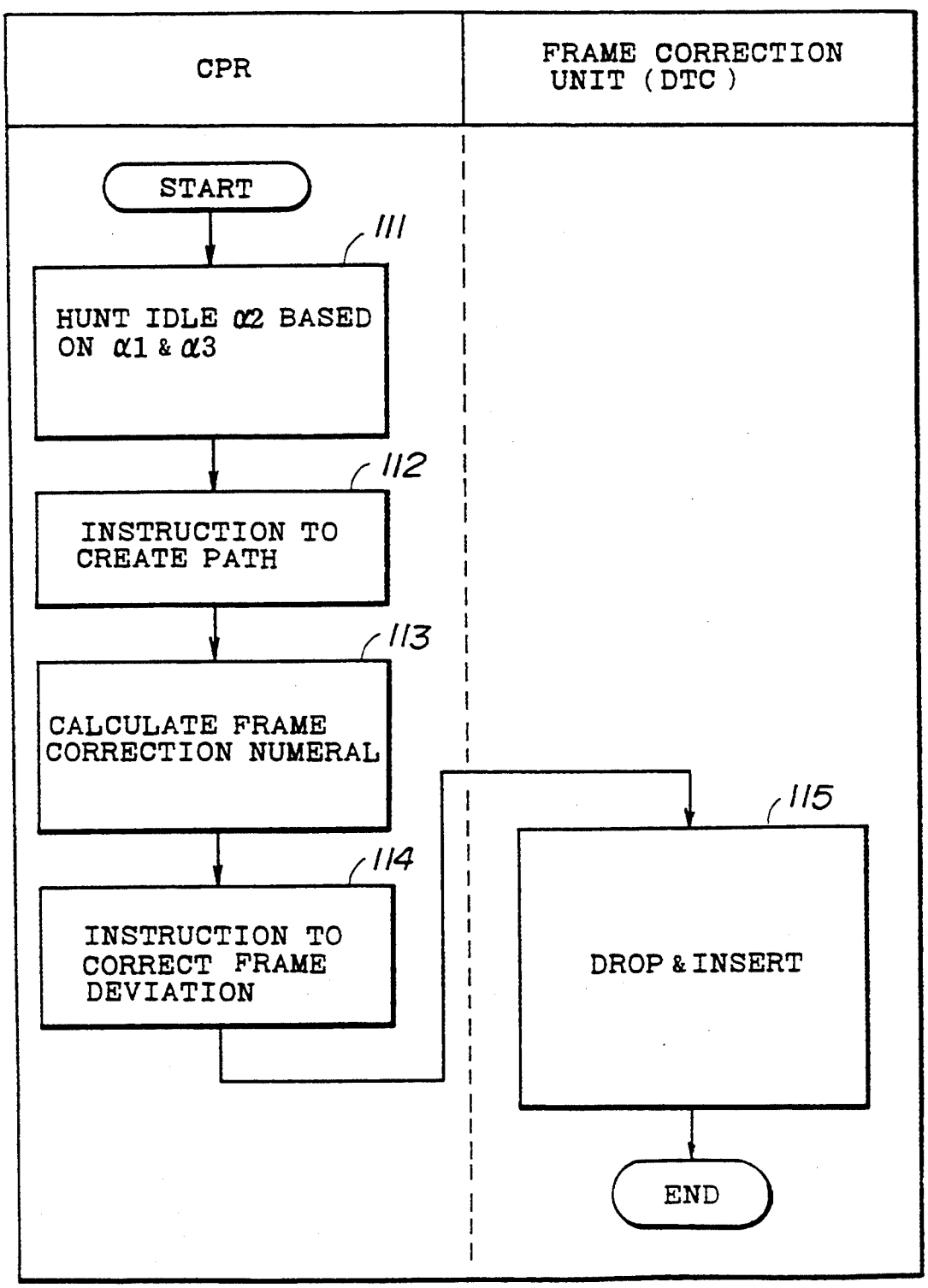
FIG. 15 is a flowchart showing the operation of a call processor and the frame correction unit shown in FIG. 13.

FIG. 15 is a flowchart showing the operation of the call processor 33 and the operation of the frame correction unit, the latter as formed in the digital terminal common unit DTC shown in FIG. 13. In order to create a path in the digital switch module DSM, at step 111 the call processor 33 obtains the input time slot number α1 and the output time slot number α3, and hunts an idle internal time slot number α2 connecting the primary time switch 36 and the space switch 37. At step 112, the call processor 33 respectively sends the time slot numbers α1, α2 and α3 to the controllers 36a, 37a and 38a via the signal receiver/driver 34 in order to create a communication path. At step 113, the call processor CPR determines the frame correction numeral based on the input time slot number α1 and the output time slot numbered α3. At step 114, the call processor 33 sends the frame correction numeral to the digital terminal common unit DTC in the way as shown in FIG. 14. At this time, information about the output time slot number α3 in which the in-band signal is placed can be sent to the digital terminal common unit DTC in the same way as described above. At step 115, the frame correction unit in the digital terminal common unit DTC executes the frame correcting procedure described previously.

Figure 16:
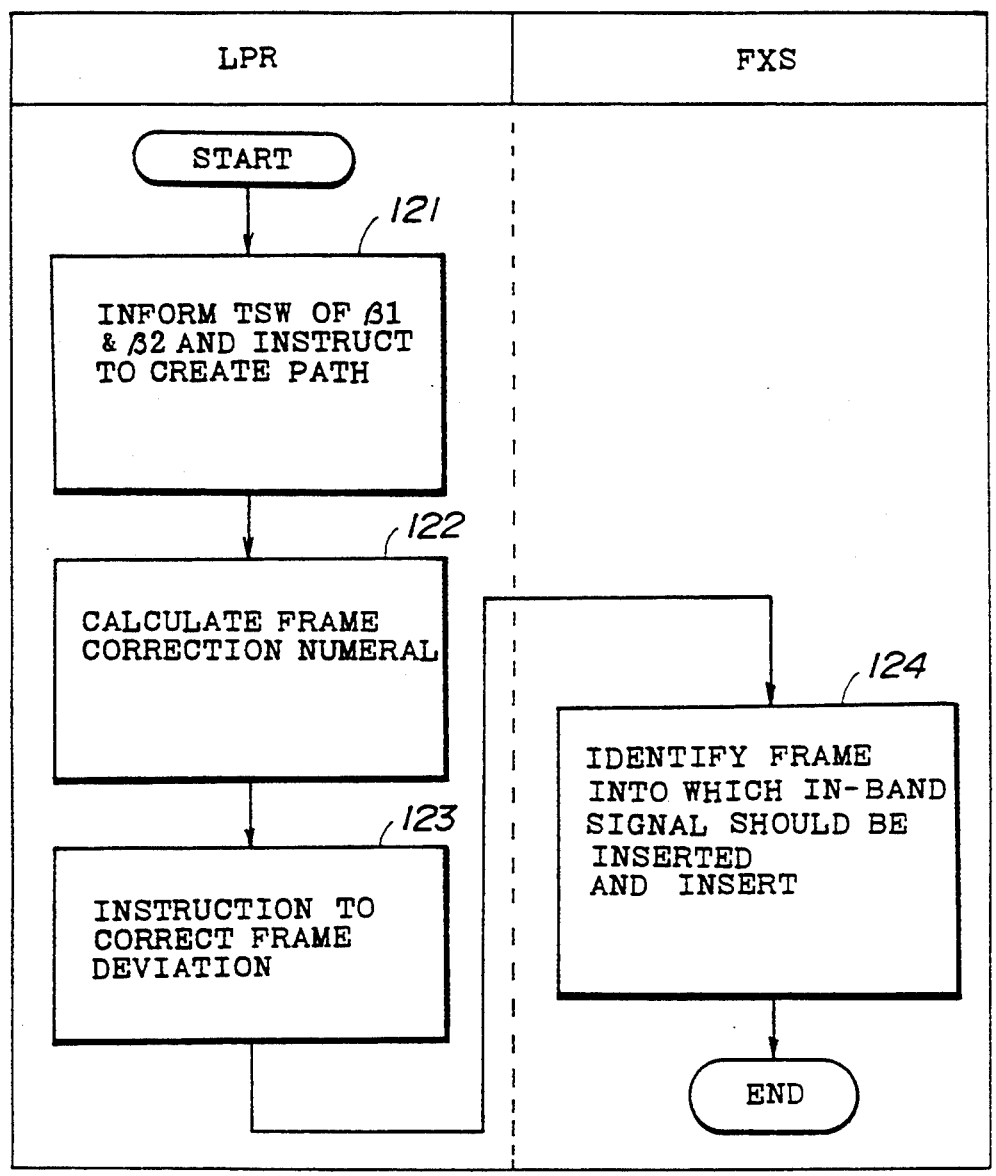
FIG. 16 is a flowchart showing the operation of a line processor shown in FIG. 9B and the channel unit shown in FIG. 9A.

FIG. 16 is a flowchart showing the operation of the line processor LPR shown in FIG. 9B and the operation of the channel unit FXS shown in FIG. 9A. At step 121, the line processor LPR informs the time switch TSW of the input time slot number β1 and the output time slot number β2 in order to create a communication path. At step 122, the line processor LPR determines the frame correction numeral which takes place based on the input time slot number β1 and the output time slot number β3. At step 123, the line processor LPR sends the frame correction numeral to the channel unit FXS of the frame correction numeral receiving circuit 22-2 (FIG. 9A) corresponding to the input time slot number β1 in the way as has been described previously. The frame correction numeral receiving circuit 22-2 determines the frame into which the in-band signal should be inserted taking into account the received frame correction numeral. Then, the signal inserter 21-1 inserts the in-band signal in the determined frame.

Figure 17A:
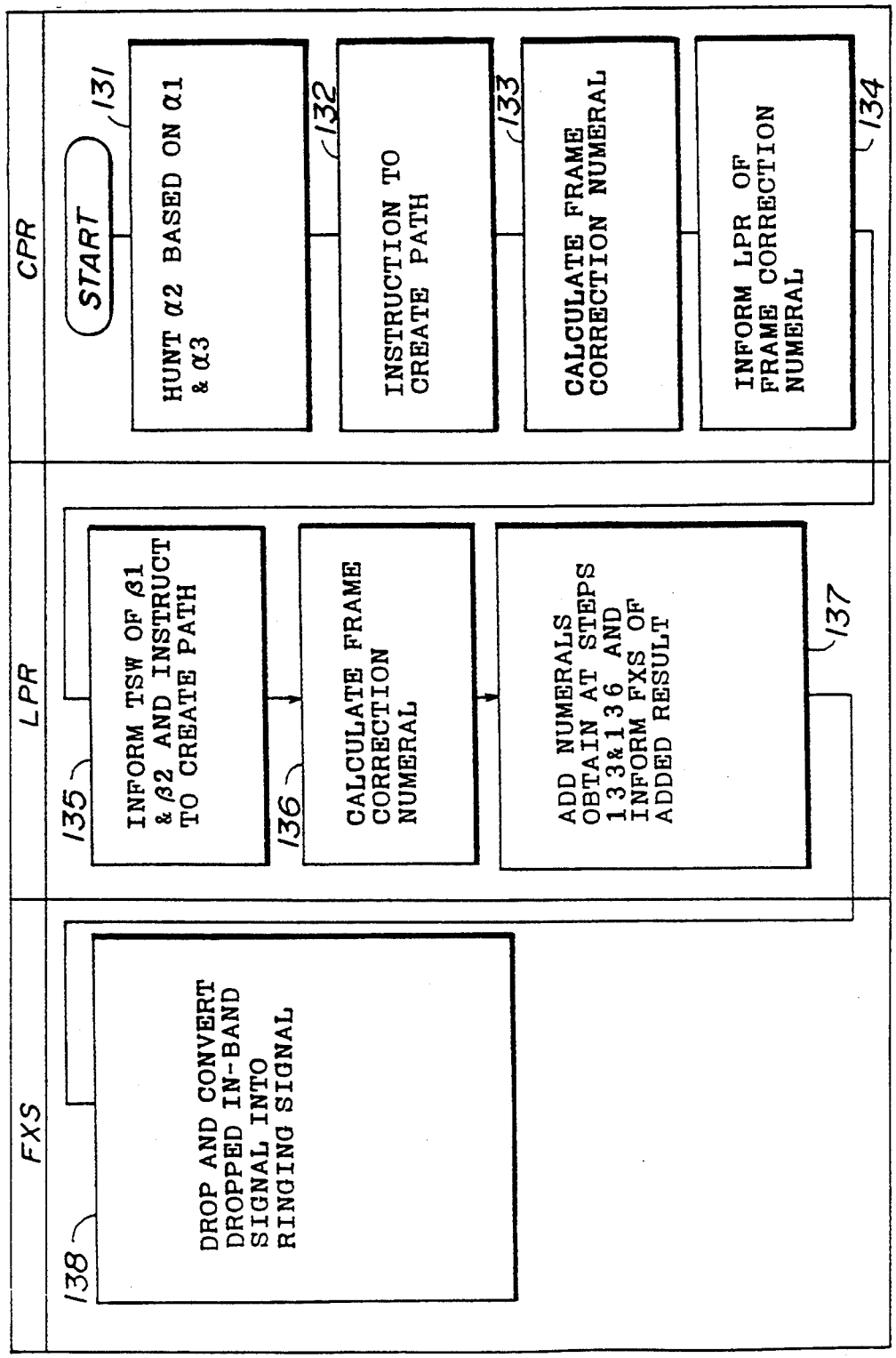
FIGS. 17A and 17B are diagrams of a variation of the embodiment of the present invention.
Figure 17B:
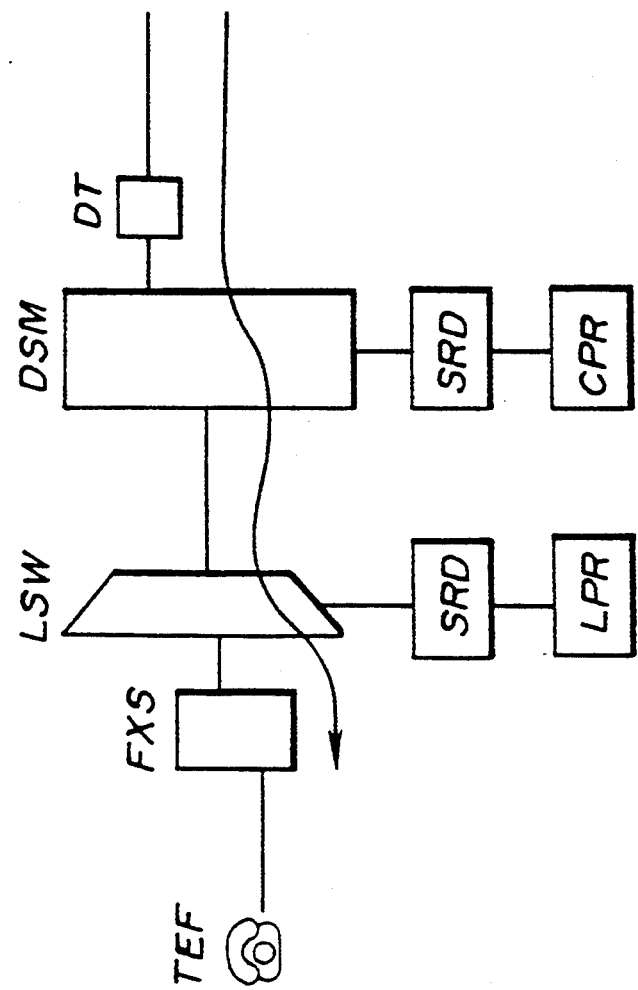

FIG. 17A is a flowchart showing the operation of the call processor CPR, the line processor LPR and the channel unit FXS according to a variation of the aforementioned structure. As shown in FIG. 17B, the system of the present invention corrects, at the channel unit FXS, a frame deviation generated in the digital switch module DSM and a frame deviation generated in the line switch LSW with respect to a signal directed to the foreign subscriber terminal TEF. The frame correction procedure shown in FIG. 17B is carried out on the back side of the line switch LSW. It will be noted that the procedure shown in FIG. 17A is carried on at the front side of the line switch LSW.

At step 131, the call processor CPR of the exchange office EX1 hunts an idle internal time slot a2 on the basis of the input time slot number a1 and the output time slot number a3. At step 132, the CPR informs the controllers 36a, 37a and 38a (FIG. 13) of the time slots α1, α2 and α3, respectively. At step 133, the call processor CPR determines the frame correction numeral based on the time slot numbers α1, α2 and α3. At step 134, the call processor 134 informs the line processor LPR of the thus determined frame correction numeral via the digital switch module DSM.

At step 135, the line processor LPR informs the time switch TSW (FIG. 9B) of the input time slot number β1 and the output time slot number β2 in order to create a communication path. At step 136, the line processor LPR determines the frame correction numeral which corresponds to a frame deviation generated between the input and output time slots β1 and β2. At step 137, the line processor LPR adds the frame correction numeral obtained at step 133 and the frame correction numeral obtained at step 136, and sends the added (i.e. summation) result to the channel unit FXS related to the output time slot number β2.

At step 138, the frame correction procedure is executed in the channel unit FXS in the same way as described previously.

The present invention is not limited to the specifically disclosed embodiments, and variations and modifications may he made without departing from the scope of the present invention.

What is claimed is:

1. An exchange circuit of a digital communication system affording a transmission path for time division multiplexed signals, one frame on which comprises n channels corresponding to n respective time slots and one multiframe of which comprises m frames, wherein n and m are integers, comprising:

time switch means for switching the time division multiplexed signals, the time switch means having an input side, at which the time division multiplexed signals transmitted thereto by the digital communication system are received and input thereto for switching thereby, and an output side, at which the time division multiplexed signals as switched thereby are output for receipt and transmission by the digital communication system, the time switch means switching input time slots of the received time division multiplexed signals to output time slots of the output time division multiplexed signals, the difference between associated input and output time slots and the delay time of the switching operation of the time switch means producing a composite delay time;

frame correction numeral determining means for determining, on the basis of the composite delay time, frame correction numerals which indicate the number of frames equal to the composite delay time between the time division multiplexed signals as received by the time switch means and the time division multiplexed signals as switched and output thereby, said frame correction numeral determining means comprising memory means for storing the frame correction numerals corresponding to composite delay times between associated input and output time slots of the respective input and output frames of the multiframes of the input and output time division multiplexed signals; and control means, associated with a selected one of the input and output sides of the time switch means and responsive to the frame correction numerals, for extracting in-band signals transmitted in the time slots of a specific frame in each multiframe of the input time division multiplexed signals, and for inserting the in-band signals in the time slots of a similarly specific frame in each multiframe of the output time division multiplexed signals.

2. An exchange circuit as recited in claim 1, wherein said control means further comprises:

in-band signal dropping means, disposed on the output side of said time switch means, for receiving the switched, output time division multiplexed signals and dropping the in-band signals therefrom, and for producing as an output time division multiplexed signals with dropped in-band signals; and in-band signal inserting means, operatively connected to the in-band signal dropping means, for receiving the output thereof and inserting the in-band signals thereinto and producing the output time division multiplexed signals; and the control means further being operative for controlling the in-band signal dropping means to drop the in-band signals from each time slot of a frame which lags behind the specific frame of the input time division multiplexed signals by a frame correction numeral and for controlling the in-band signal inserting means to insert the in-band signals into the time slots of the specific frame of the output time division multiplexed signals.

3. An exchange circuit as recited in claim 1, wherein:
the received time division multiplexed signals are PCM multiplexed signals having a first format; and
said time switch means further comprises format change means for changing the first format of said received PCM multiplexed signals into a second, different format.

4. An exchange circuit as recited in claim 1, wherein said time switch means further comprises:
a line switch connected to a plurality of subscriber terminals.

5. An exchange circuit as claimed in claim 4, wherein said exchange circuit further comprises:
a foreign subscriber terminal; and
a channel unit coupling said foreign subscriber terminal to said line switch and controlling said foreign subscriber terminal on the basis of said in-band signals so that said foreign subscriber terminal operates as a terminal accommodated in a control exchange office coupled to the exchange circuit via said digital communication system.

6. An exchange circuit as claimed in claim 1, wherein:
each of said time slots has a plurality of bits; and
said in-band signal is placed at a predetermined bit of said plurality of bits in each of the time slots in said specific frame.

7. An exchange circuit as claimed in claim 1, wherein said time switch means comprises a plurality of switches which are cascade-connected.

8. An exchange circuit as recited in claim 1, wherein said control means further comprises:

in-band signal dropping means, disposed on the input side of said time switch means, for receiving the input time division multiplexed signals and dropping the in-band signals therefrom, and for producing as an output the input time division multiplexed signals with dropped in-band signals; and in-band signal inserting means, operatively connected to the in-band signal dropping means, for receiving the output thereof and inserting the in-band signals thereinto and producing the received time division multiplexed signals input to the time switch means; and the control means further being operative for controlling the in-band signal dropping means to drop the in-band signals from each time slot of the specific frame of the input time division multiplexed signals and for controlling the in-band signal inserting means to insert the in-band signals into the time slots of a frame which precedes the specific frame of the input time division multiplexed signals by a frame correction numeral.

* * * * *

UNITED STATES PATENT AND TRADEMARK OFFICE
CERTIFICATE OF CORRECTION

PATENT NO. : 5,448,556
DATED : September 5, 1995
INVENTOR(S) : Katsuyuki Nakamura et al It is certified that error appears in the above-indentified patent and that said Letters Patent is hereby corrected as shown below:

Column 1, line 45, change "B" to --5--.

Column 5, line 4, delete "a";

line 23, change "$\leqq$" to --≤--;

line 24, change "$\leqq$" to --≤--;

line 27, change "$\leqq$" to --≤--;

line 35, change "<" to -->--;

line 57, change "," to --."

(first occurrence only).

UNITED STATES PATENT AND TRADEMARK OFFICE
CERTIFICATE OF CORRECTION

PATENT NO.   : 5,448,556
DATED        : September 5, 1995
INVENTOR(S)  : Katsuyuki Nakamura et al It is certified that error appears in the above-indentified patent and that said Letters Patent is hereby corrected as shown below:

Column 6, line 16, change "$\leq$" to --$\leq$--

(both occurrences).

Column 7, line 22, change "Structure" to

--structure--.

Column 9, line 64, change "unit" to --unit,--.

Column 11, line 6, change "4.5" to --45--.

Column 12, line 57, change "he" to --be--.

Signed and Sealed this

Sixteenth Day of January, 1996

Attest:

BRUCE LEHMAN

*Attesting Officer*     *Commissioner of Patents and Trademarks*